July 13, 1965 H. GANG 3,194,495

DECIMAL POINT MECHANISM

Filed Sept. 7, 1962 15 Sheets-Sheet 1

INVENTOR.
HERMAN GANG

BY [signature]

ATTORNEY

DECIMAL POINT MECHANISM

Filed Sept. 7, 1962 15 Sheets-Sheet 2

INVENTOR.
HERMAN GANG

BY

George V. Hall
ATTORNEY

July 13, 1965 H. GANG 3,194,495

DECIMAL POINT MECHANISM

Filed Sept. 7, 1962 15 Sheets-Sheet 3

INVENTOR.
HERMAN GANG

BY

ATTORNEY

July 13, 1965 H. GANG 3,194,495

DECIMAL POINT MECHANISM

Filed Sept. 7, 1962 15 Sheets-Sheet 4

| 5a | 5b | 5c |
|---|---|---|

INVENTOR.
HERMAN GANG

BY George V. Hall
ATTORNEY

DECIMAL POINT MECHANISM

INVENTOR.
HERMAN GANG

BY

George V. Hall
ATTORNEY

July 13, 1965 H. GANG 3,194,495

DECIMAL POINT MECHANISM

Filed Sept. 7, 1962 15 Sheets-Sheet 6

| 5a | 5b | 5c |
| --- | --- | --- |

INVENTOR.
HERMAN GANG

BY

George V. Hall
ATTORNEY

INVENTOR.
HERMAN GANG
BY
George V. Hall
ATTORNEY

INVENTOR.
HERMAN GANG
BY
George V. Hall
ATTORNEY

July 13, 1965 H. GANG 3,194,495

DECIMAL POINT MECHANISM

Filed Sept. 7, 1962

15 Sheets-Sheet 9

INVENTOR.
HERMAN GANG

BY

George V. Hall
ATTORNEY

July 13, 1965 H. GANG 3,194,495

DECIMAL POINT MECHANISM

Filed Sept. 7, 1962 15 Sheets-Sheet 10

INVENTOR.
HERMAN GANG

BY

Berget V. Hall
ATTORNEY

July 13, 1965 H. GANG 3,194,495

DECIMAL POINT MECHANISM

Filed Sept. 7, 1962 15 Sheets-Sheet 11

INVENTOR.
HERMAN GANG

BY

George V. Hall
ATTORNEY

July 13, 1965 H. GANG 3,194,495

DECIMAL POINT MECHANISM

Filed Sept. 7, 1962

15 Sheets-Sheet 12

INVENTOR.
HERMAN GANG

BY

George V. Hall
ATTORNEY

INVENTOR.
HERMAN GANG

BY

George V. Hall
ATTORNEY

July 13, 1965 H. GANG 3,194,495

DECIMAL POINT MECHANISM

Filed Sept. 7, 1962 15 Sheets-Sheet 14

INVENTOR.
HERMAN GANG

BY

George V. Hall
ATTORNEY

INVENTOR.
HERMAN GANG

BY

George V. Hall
ATTORNEY

United States Patent Office 3,194,495
Patented July 13, 1965

3,194,495
DECIMAL POINT MECHANISM

Herman Gang, Morris Plains, N.J., assignor to Monroe International Corporation, a corporation of Delaware
Filed Sept. 7, 1962, Ser. No. 222,144
19 Claims. (Cl. 235—60.15)

This invention relates to decimal point mechanism for printing calculators, and more particularly to such mechanism for printing calculators of the ten key type.

The prior art discloses means operable, in a ten key calculator, to locate and print a decimal point with respect to a printed value. Such decimal point printing means, for example, is disclosed in Patents 2,917,232 and 2,987,246. However, for a plurality of values the decimal point may be ordinally located in a plurality of positions with respect to the printing mechanism and in such instances the values cannot be accumulated.

Decimal control means of application S.N. 819,174 discloses means for registering both factors and results in ordinally correct relation with respect to a fixed decimal point position, and printing each value with the decimal point thereby avoiding the disadvantage of the aforenoted prior art. It will be noted, however, that the fixed decimal point position must be selected to accommodate products and dividend, and that zeros must be added to multiplicands, multipliers, divisors and quotients to ordinally relate them to the fixed decimal point position. This will be evident when it is considered that the number of decimal digits in a product is equal to the sum of the decimal digits in the multiplicand and multiplier, and that the number of decimal digits in a dividend is equal to the sum of the decimal digits in the divisor and quotient.

In view of the above, it is considered more desirable to print factors (multiplicands and multipliers) with the decimal point in fixed positions determined by the greatest number of decimal digits in the respective factors, and to print products with the decimal point in a fixed position determined by the sum of decimal places for the two factors. Furthermore, it is more desirable to print dividends with the decimal point in a fixed position determined by the greatest number of decimal digits in a dividend, to print divisors with the decimal point in a fixed position determined by the greatest number of decimal digits in a divisor, and to print quotients with the decimal in a fixed position determined by the difference of the decimal places for the dividends and for the divisors. The above outlined arrangement is more in keeping with arithmetic rules and permits the accumulation of results.

It is therefore the primary object of the invention to control ordinal registration of values in a ten key calculator so that different pluralities of said values will be printed in ordinally correct relation with respective fixed decimal points.

More specifically, it is an object to control the ordinal position of the selector carriage of a ten key calculator so that factors (multiplicands, multipliers, dividends, divisors) entered therein will be printed in ordinally correct relation with respective fixed chemical points, and to so control entry of the factors into the machine in such ordinal positions that the ensuing calculations will result in registration of the products and quotients around fixed decimal positions for printing with the decimal point.

A further object is to prevent operation of the machine when the number of whole number digits entered into the selector carriage exceeds the capacity of the carriage as determined by setting for entry of a given number of decimal digits.

A further object is to prevent operation of the machine when the number of decimal digits entered into the selector carriage exceeds the number of decimal digits for which the machine is set to receive.

The invention embodied in a ten key type printing calculator, includes a plurality of normally disabled decimal point type members respectively located to the right of successive higher order digit type members beginning with the lowest order. The decimal point type members are selectively enabled, and therefore provision is made to print different numbers of decimal digits.

A value is set in a selector carriage upon successive depression of keys of the ten key keyboard corresponding to the digits of the value from higher to lower orders in the usual manner. Furthermore, a decimal key is depressed in proper sequence with the digit keys. Upon depression of the decimal key, decimal point selection means is coupled for movement with the carriage upon subsequent entry of the decimal digits.

There are three selectively settable selector carriage stop devices selectively cooperable with the decimal point selection means which is coupled for movement with the carriage. Decimal point type enabling means is settable in accordance with the setting of each carriage stop device. Carriage shift toward the left is terminated by a selected one of the stop devices, as determined by depression of a particular function control key, in cooperation with the coupled decimal point selection means. The left shift of the carriage is terminated by the selected stop device in such position that the value will be printed in correct ordinal position with the decimal point selected by the setting of the selected stop device.

The digit type members of the printing mechanism are adjusted from normal zero position in accordance with the excursions of operating racks and then the printing mechanism is operated. After the printing operation, the racks in their return strokes, restore the type members. The excursions of the operating racks are controlled by the selector carriage to register a value and to print said value with the decimal point, or in total taking operations the excursions are controlled in accordance with values registered in any selected one of a plurality of registers to print a product, quotient or remainder.

It is old and well known in the art to provide means in a machine cycle for controlling engagement of a selected one of a plurality of registers or of setting means for rotary differentially settable digital actuators with operating racks, and for controlling the excursions of the racks in accordance with selector carriage settings in a value entering operation; or for controlling the excursions of the racks in accordance with zeroizing movement of the numeral wheels of a selected register in a total taking operation. Also programs of multiplication including count out of each multiplier digit followed by step shifting of the rotary digital actuators after each count out, and programs of division including registration of each quotient digit followed by step shift shifting of the digital actuators are well known in the art. A complete understanding of the operation of the devices of the invention therefore will necessitate with respect to these operations, only a description of the ordinal relationship of the selector carriage with respect to the racks which effect digital adjustment of the type member in a value entering operation, and the ordinal relationship of the shiftable digital actuators with which the machine is equipped with respect to the racks in value entering operations for said actuators. The invention, however, will best be understood from the following description with reference to the accompanying drawings in which:

FIGS. 1*a* and 1*b* are a longitudinal section through the machine embodying the invention, and showing the registering and printing mechanism.

FIGS. *5a*, *5b*, and *5c* are a mechanical schematic of parts of the machine in association with the decimal point system, and with parts in different planes shown in one horizontal plane for clarity.

Figure 6:
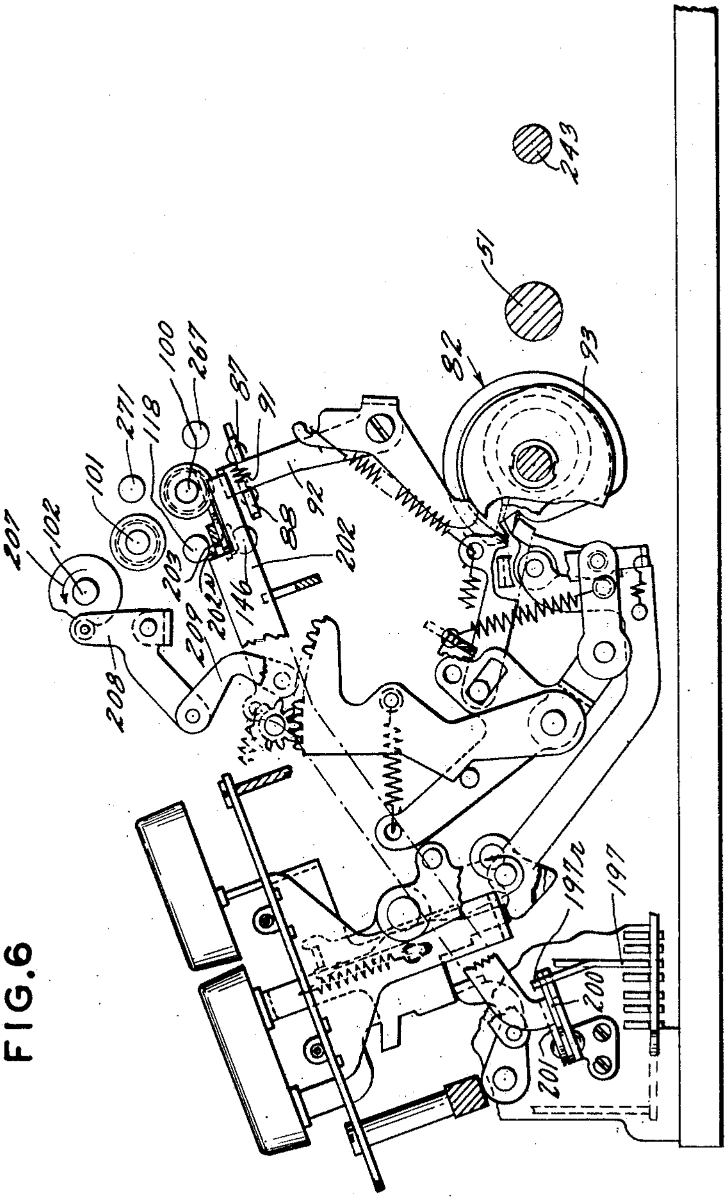

FIG. 6 is a fragmentary side elevation of the single cycle clutch operable in entry of digits in the selector carriage and in control of the carriage escapement means.

Figure 7:
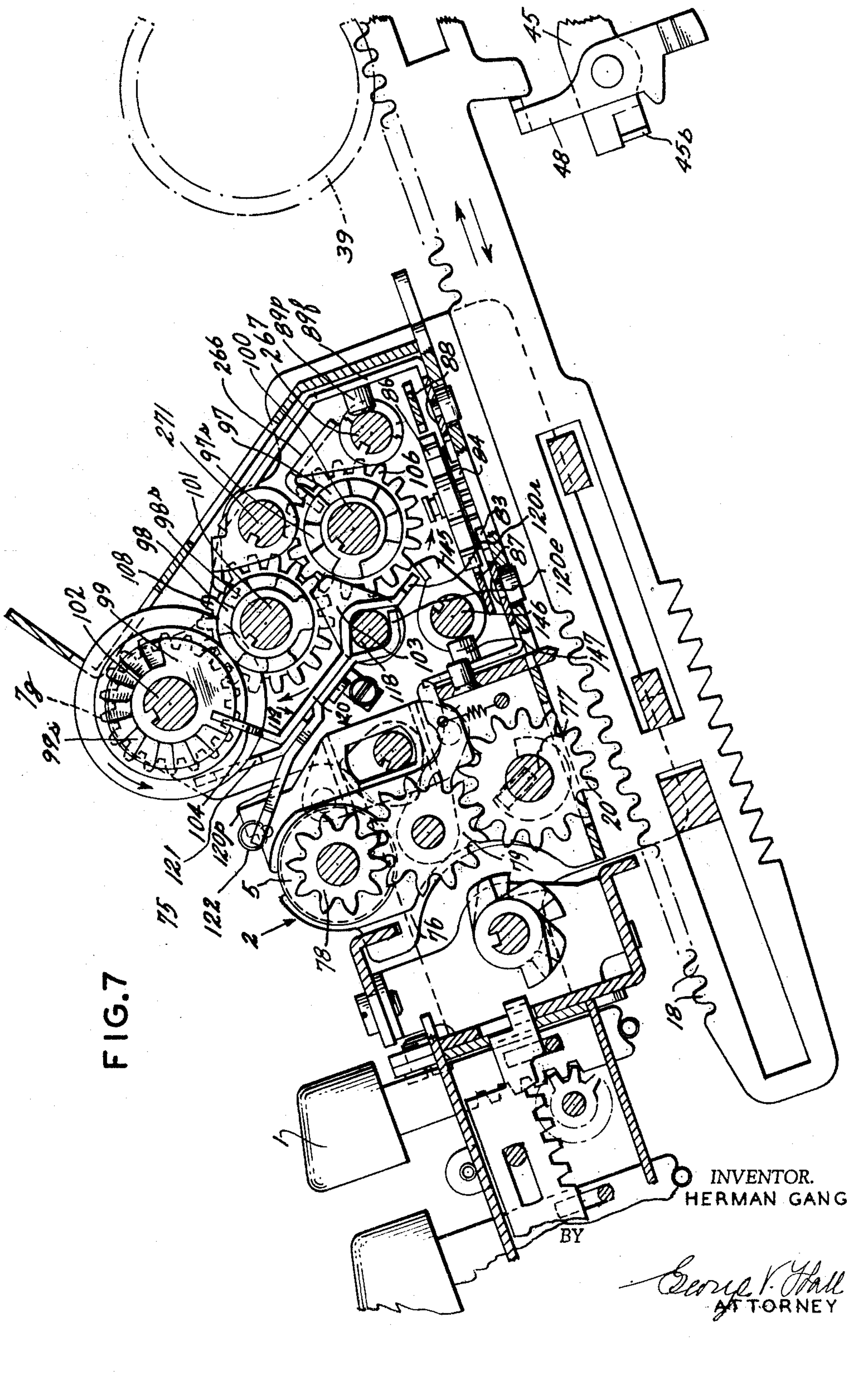

FIG. 7 is a right side fragmentary section of the selector carriage, the stop carriage and the stop means.

Figure 8:
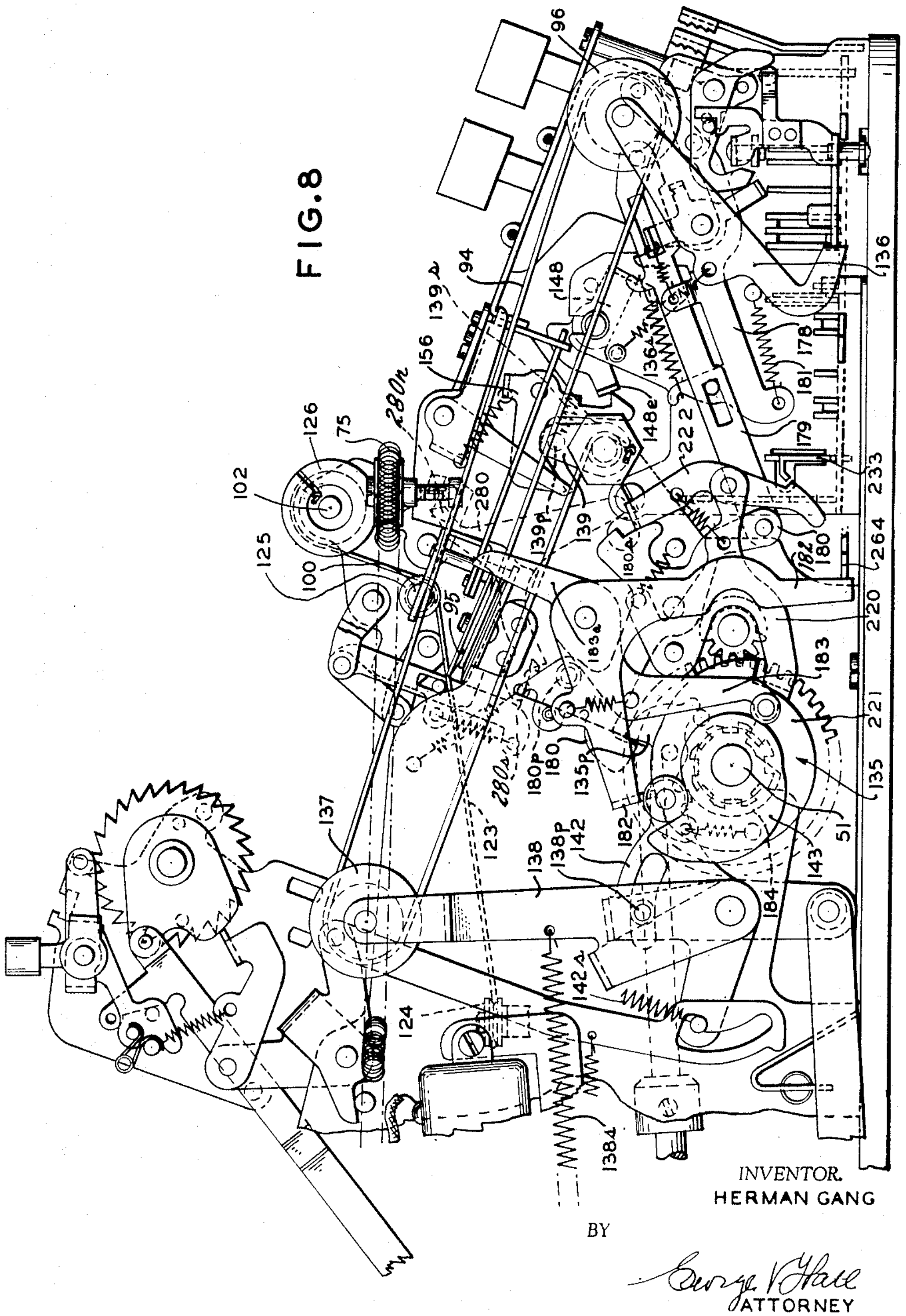

FIG. 8 is a left side view of the front portion of the machine.

Figure 9:
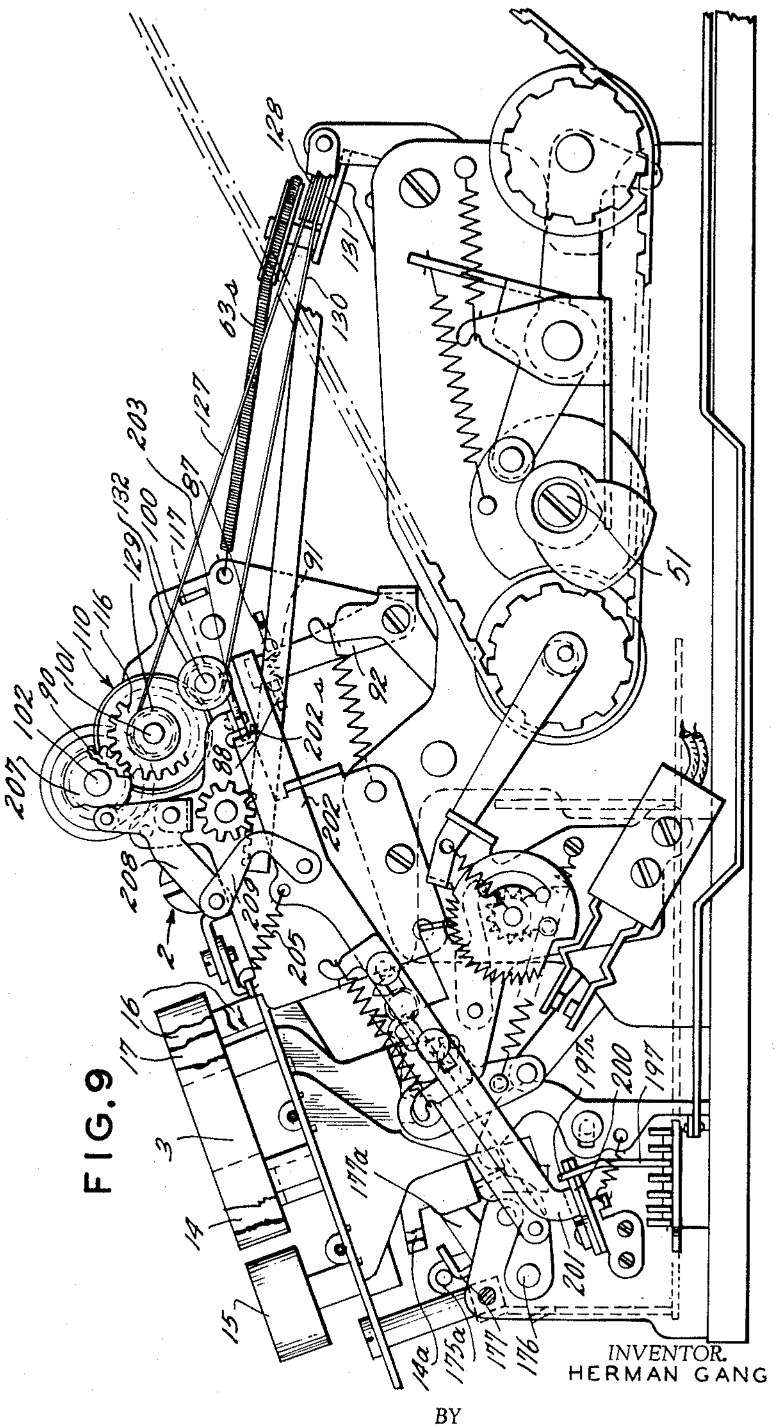

FIG. 9 is a right side view of the front portion of the machine.

Figures 10, 10A:
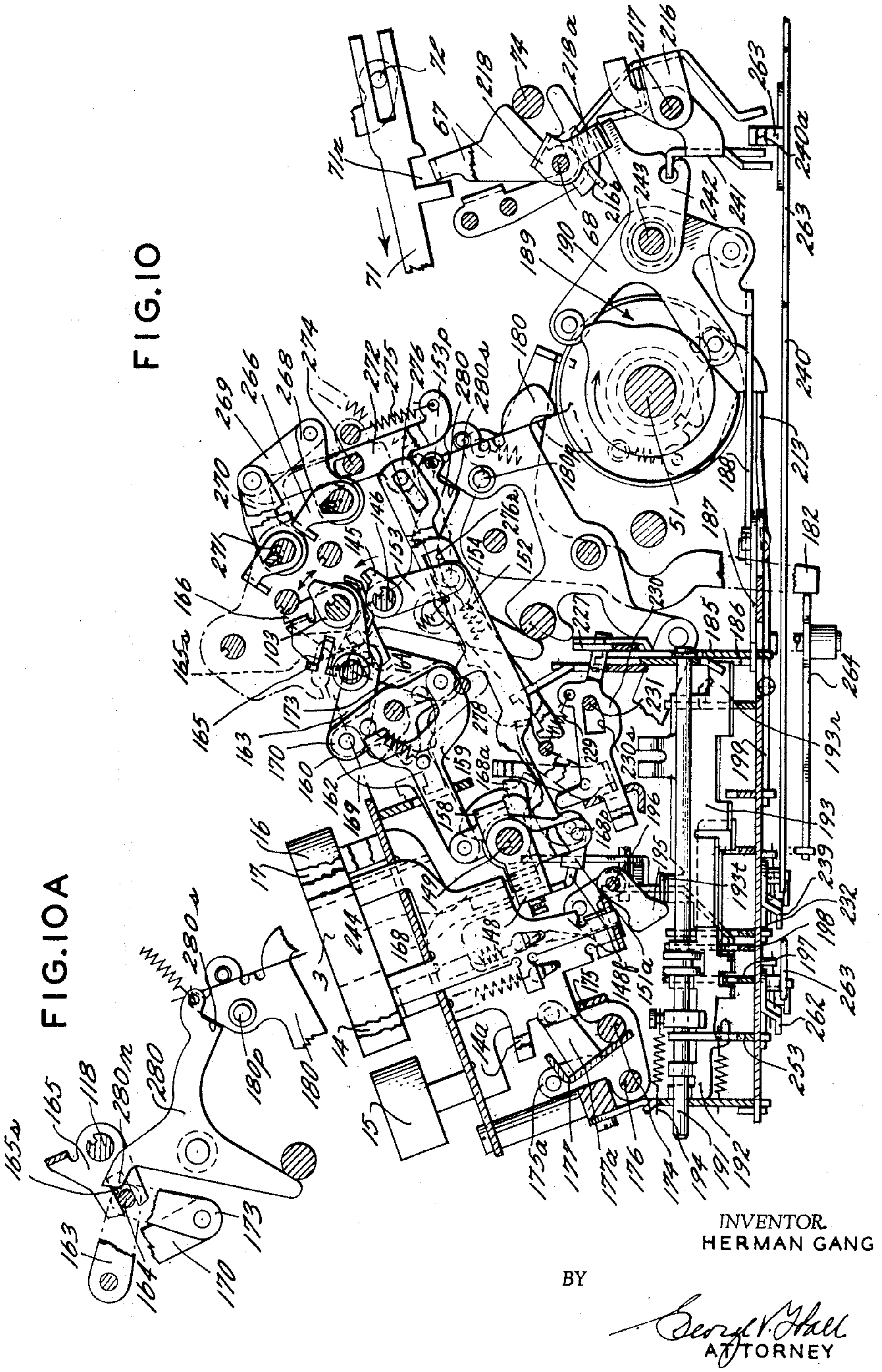

FIG. 10 is a fragmentary side view showing the decimal key, function keys and associated mechanism.

FIG. 10A is a fragmentary detailed view of means for controlling engagement of the main clutch.

Figure 11:
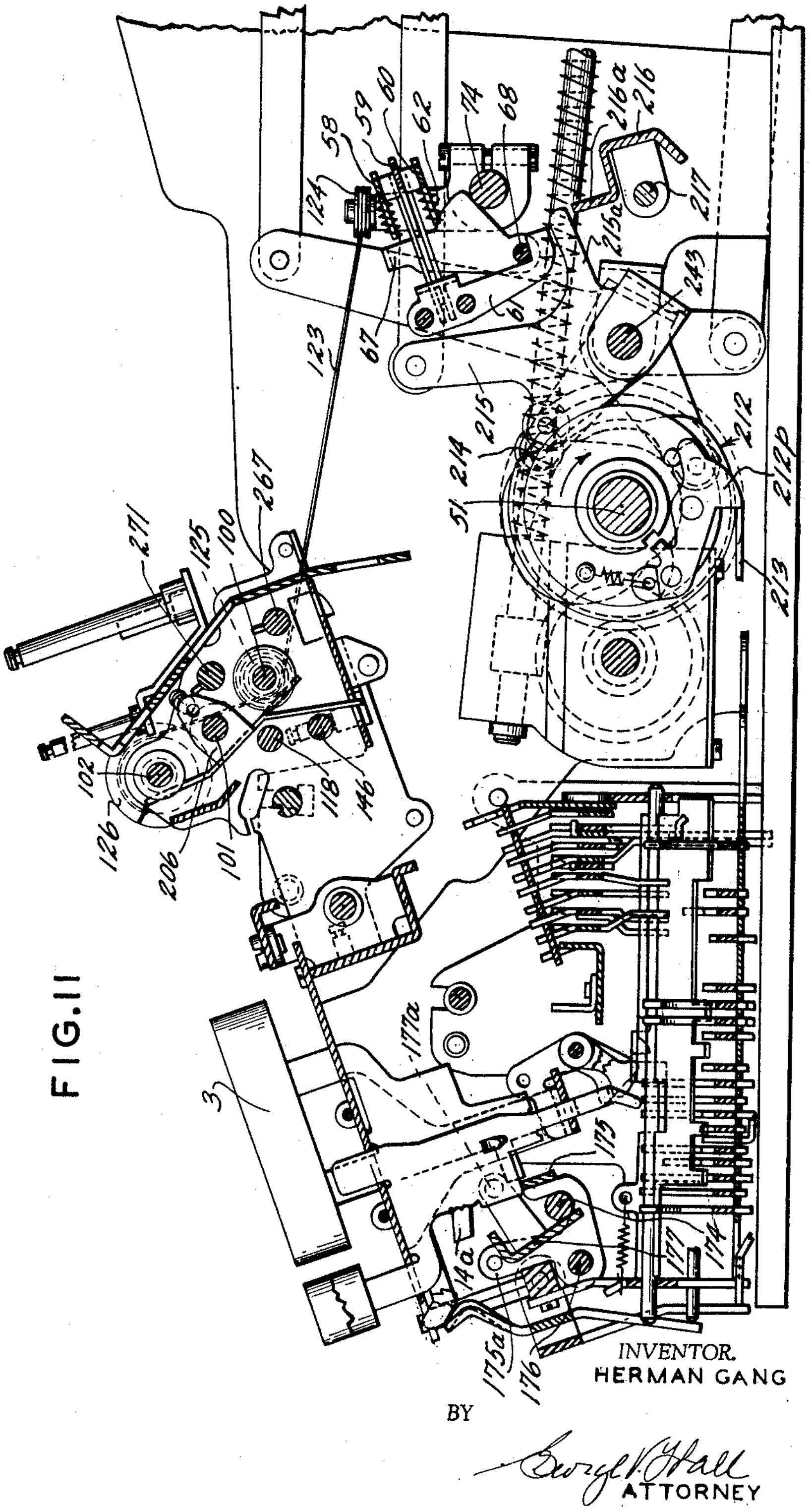

FIG. 11 is a longitudinal section through the keyboard and mechanism to the rear showing the program means for the decimal point selection means.

Figure 12:
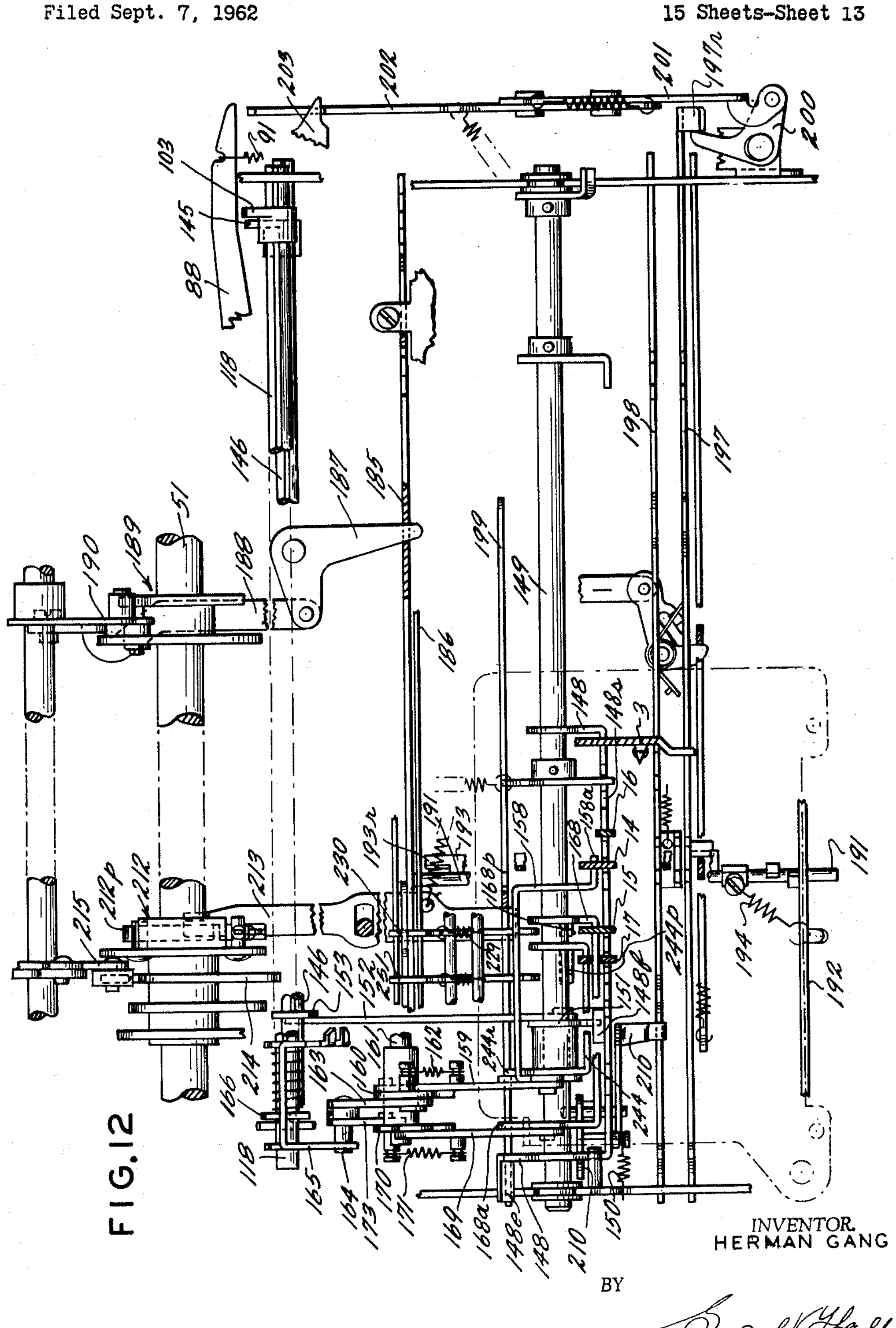

FIG. 12 is a top plan view of the program means for the decimal point selection means.

Figure 13:
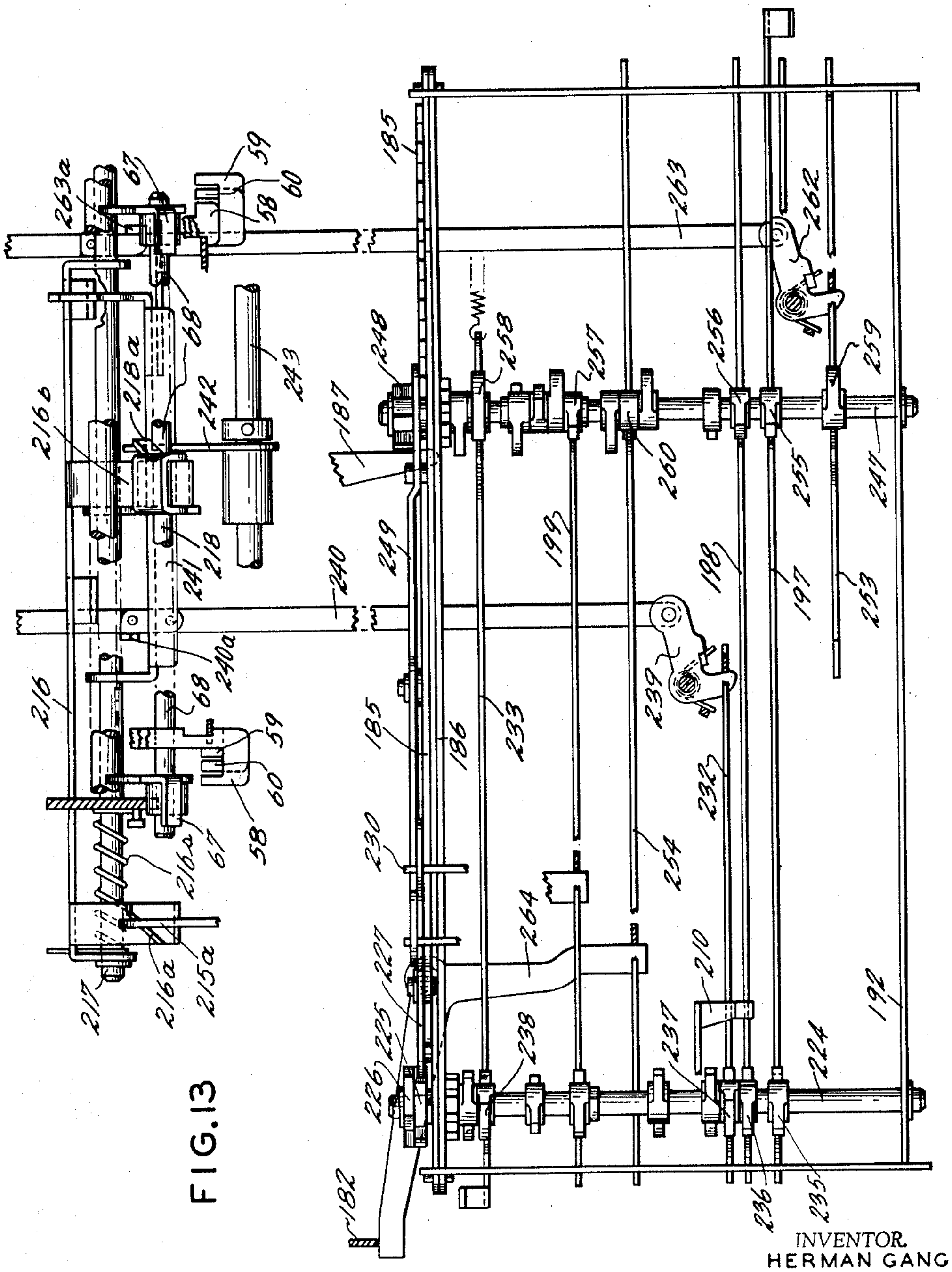

FIG. 13 is another top plan view of additional program means for the decimal point selection means.

Figure 14:
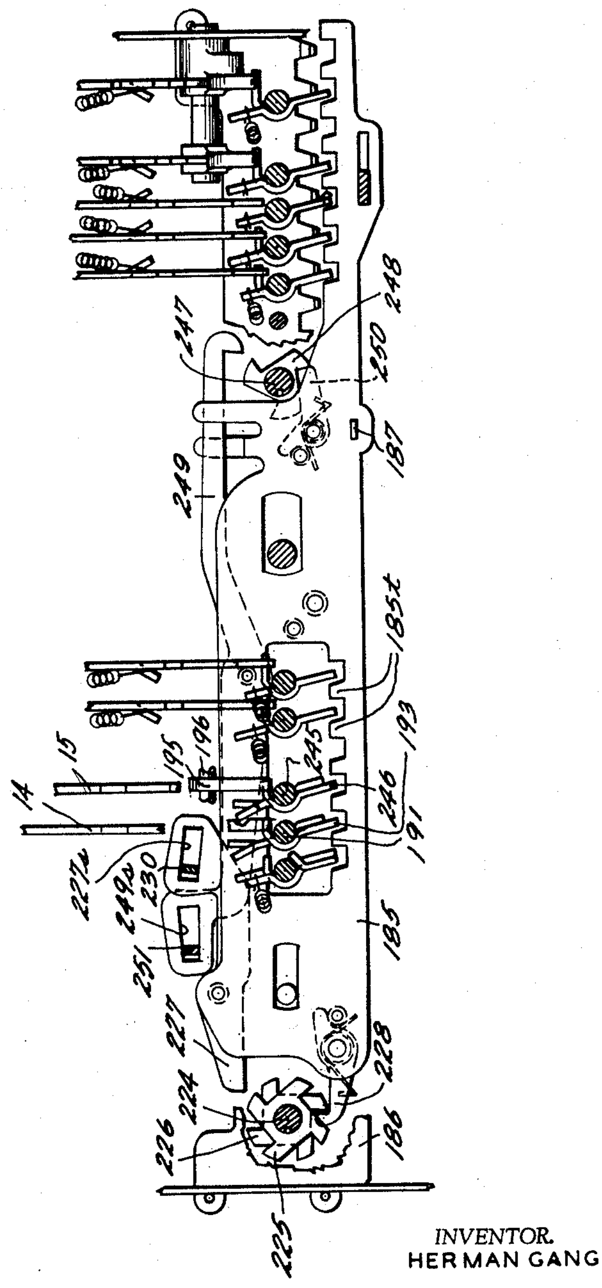

FIG. 14 is a front elevation of the drive means for the program means.

*General description*

Referring to FIGS. *1a*, *1b*, 2, *5a*, *5b* and *5c*, the machine has, at its front, a keyboard including the usual grouping of numeral keys 1 of the digital values 0 to 9 inclusive for controlling entry of selective values into a selector carriage 2 which has a twelve digit capacity as later described. A decimal key 3 located to the left of keys 1 is adapted to be depressed in proper decimal sequence with keys 1 when a value includes decimal digits. To the rear of keys 1 is a window 4 for displaying numeral wheels 5 which are successively moved into view as digits are entered into carriage 2 and are adjusted in accordance with the values of the digits.

To the rear of window 4 is a pair of decimal dials 6, 7 each manually settable to 0–7 decimal digit positions. The setting of dial 6 determines that a multiplier or quotient will be printed in ordinally correct relation with the decimal point to provide the number of decimal digits indicated by the setting. The setting of dial 7 determines that a multiplicand or divisor will be printed in ordinally correct relation with the decimal point to provide the number of decimal digits indicated by the setting. And the settings of dials 6, 7 together determine that a product or a dividend will be printed in ordinally correct relation with the decimal point to provide the number of decimal digits equal to the sum of the two settings.

To the right of numeral keys 1 are function control keys including an add key 10, a subtract key 11, a total key 12 and a subtotal key 13. To the left of numeral keys 1 are function control keys including a multiplicand entry key 14, a multiplier entry key 15, a dividend entry key 16 and a divisor entry key 17. Other keys shown without designation control functions which are not necessary to an understanding of the invention.

There is an ordinal series of twenty-one front racks 18, the twelve lowest orders of which may be controlled by selector carriage 2, and entrained with the racks are digit type wheels 19 of a printing unit, later described.

Selector carriage 2 includes a series of twelve storage selector gears 20. Selector carriage 2 is normally positioned, in the usual manner, with the highest order selector gear one ordinal position to the right of the lowest order rack 18. Upon successive depression of digit keys 1, the values of the depressed keys respectively are entered into the selector gears from higher to lower orders, and the carriage is step shifted toward the left to bring the set selector gears 20 successively from higher to lower orders into controlling position with respect to racks 18 from lower to higher orders. It will be noted that the racks above the twelfth order are beyond the range of selector carriage 2. These higher order racks along with the lower orders are controlled in total taking from registers of the machine for printing of results as later described.

Racks 18 are reciprocably operable in forward and return strokes during each cycle of a main clutch 135 (FIG. 8) in the usual manner. Forward stroke refers to the first stroke of each cycle, as is customary, regardless of the direction with respect to the machine. In this machine the forward stroke of the racks is toward the rear of the machine.

Before a forward stroke of racks, 18, the set selector gears 20 are brought into engagement with the associated racks 18 which in their forward stroke will rotate said gears to their normal zero position where they are arrested from further rotation. Therefore the forward excursions of racks 18 correspond to the settings of the associated respective gears 20. It will be recognized that selector carriage 2 could include the well-known pin stops settable upon depresssion of digit keys 1 in lieu of selector storage gears 20 to control the excursions of racks 18.

During the forward excursions of racks 18, digit type wheels 19 are rotated to the values corresponding to the settings of the respective gears 20. Then the printing operation is performed and the type wheels are restored during the return strokes of the racks with gears 20 disengaged in zero position. Control means whereby gears 20 are engaged and disengaged with racks 18 in timed relation with their reciprocatory operation is well known and is not concerned with the operation of the devices of the invention.

The settings of decimal dials 6, 7 provides for the printing of a maximum of fourteen decimal digits as previously noted. When decimal dials 6, 7 are set for zero decimal digits, provision is made to print a decimal point to the right of the lowest order whole number digit. Therefore to provide for the appropriate decimal point printing, normally disabled decimal point type members 21 are located to the right of and operatively associated with the respective fifteen lowest order type wheels 19. When a decimal point type member has been enabled, it is simultaneously operable with the associated type wheel to print a decimal point to the right of the digit. The particular decimal point type member which is enabled is determined by complementary control of means operable in accordance with the settings of either or both of the decimal dials 6, 7, and the function control key which initiates a machine cycle.

A rear rack 23 is coupled by roller and slot connection 24 with each front rack 18. The pairs of racks 18, 23 therefore are reciprocated in unison. A nonshiftable product-dividend register comprises an ordinal series of twenty-one numeral wheels 25 including input gears 25*a* are operatively associated with racks 23. Racks 23 are operable to enter a dividend set in selector carriage 2 into register wheels 25, or to zeroize wheels 25 in a total taking operation of a value registered in the wheels.

An ordinal series of twelve rotary differentially settable digital actuators 26 unidirectionally driven independently of racks 18 and 23 are mounted in a shiftable carriage 27 and are thereby ordinally shiftable with respect to product dividend register wheels 25 in programs of multiplication and division. Substraction is performed by complemental registration, and therefore nonsettable actuators 26*a* (FIG. *5a*) each having nine teeth are located to the left and are rotatably driven and shifted with differential actuators 26. In additive operation, actuators 26*a* are driven idly. In substraction, the actuator unit is shifted a short distance to the right to bring the complemental setting of actuators 26 and actuators 26*a* into effective position with respect to register wheels 25.

Actuators 26 are provided with setting gears 28 which are operated by racks 23 to set said actuators in accordance with a multiplicand or a divisor set in selector carriage 2. Suitable rotary tens transfer actuators disclosed in applicant's application No. 18,374 and with which the invention is not concerned are operable in time with digital actuators 26, 26*a*. Consequently high speed rotary registering operation is achieved in conjunction with listing in the usual manner. The setting of the rotary digital actuators 26 and the control of their registering operation does not concern the decimal devices of the invention only in the provision to effect registration of a product in particular orders of the register for a total taking operation.

A nonshiftable multiplier-quotient register comprises an ordinal series of ten storage gears 30 associated with the ten lowest order racks 23. The associated racks 23 are operable to enter a multiplier set in selector carriage 2 into gears 30, or to zeroize the gears in a total taking operation of a value registered in said gears.

Figure 5A:
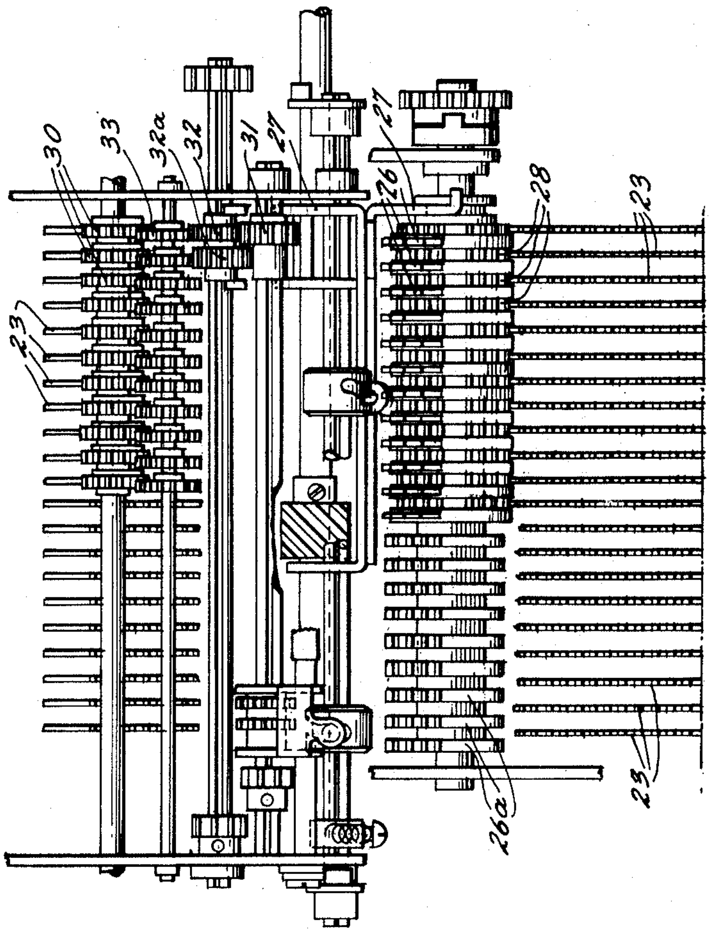

A counting gear 31 and an intermediate counting gear 32 are mounted in carriage 27 and are therefore shiftable with rotary actuators 26, 26*a*. Each of the storage gears 30 is driven by an intermediate storage gear 33. With carriage 27 in rightmost shifted position, the lowest order digital actuator 26 is in registering position with respect to the lowest order wheel 25, and counting gear 32 engages the lowest order intermediate storage gear 33 (FIG. 5*a*).

In a program of multiplication, carriage 27 is ordinally shifted toward the left as counting gears 31, 32 count out successive higher order digits in storage gears 30, 33, and as a multiplicand set in rotary actuators 26 is registered in the successive higher order register wheels 25 to accumulate a product. A gear 32*a* mounted one ordinal position to the left of gear 32 engages the next higher order intermediate storage gear 33 and is shiftable with gears 31, 32, This gear 32*a* operates in connection with short cutting of the multiplication program and with which operation the invention is not concerned.

In a program of division, a carriage 27 is shifted toward the right and the quotient is counted into the successive lower order storage gears 30, 33 as division is performed by the well known substract, add, shift method with the dividend entered in register wheels 25 and the divisor in rotary actuators 26.

Values set in selector carriage 2 may be added or subtracted in an accumulator register 34 (FIG. 1*b*) by operation of racks 23 in response to depression of add and subtract keys 10, 11. Also values registered in wheels 25 of the product-dividend register may be transferred to accumulator 34. A disclosure of these operations however is not necessary to an understanding of the invention.

*The printing mechanism (digit printing)*

Each type wheel 19 (FIGS. 1*a*, 3, 4) is mounted at the upper end of a hammer plate 35 which is pivotally mounted on a partition plate 36. Partition plates 36 are supported in spaced relationship on a pair of transverse rods 37 and 38. Hammer plates 35 are urged clockwise for printing operation by springs 42 and are normally restrained in counterclockwise position by a firing bail 43 and a restore bail 44. Each wheel 19 is rotatably adjusted by an associated rack 18 through a suitable gear train 39, 40, and 41.

Associated with each hammer plate 35 is a latch comprising an arm 45. Arms 45 are pivotally mounted at their rear on a transverse rod 46 and each has a shoulder 45*a* overlying a lug 35*a* at the lower end of the associated plate 35. At the front end of each latch 45 is a rightwardly extending lug 45*b* which underlies the next lower order latch 45. Thus if a latch 45 is raised to release a hammer 35, all lower order latches will likewise be released to provide for printing of lower order zeros in well-known manner. It will be noted (FIG. 1*a*) that there is a slight clearance between shoulders 45*a* and lugs 35*a* which clearance is maintained by action of firing bail 43 restraining hammers 35. This clearance permits easy release of latches 45. The released latches however will not be effective to release the associated hammers until the hammers are subsequently released by bail 43.

Latches 45 are operated by vertically disposed trip levers 48 which are mounted adjacent the front ends of the latches and which are controlled by racks 18. When racks 18 are in their normal zero registering position a depending lug 18*a* of each rack engages and holds a trip lever 48 counterclockwise against the urge of a spring to locate the lower end of said lever out of the path of a tripping bail 49. When the rack moves in a forward excursion from its zero position, lug 18*a* permits clockwise movement of lever 48 by its spring and therefore the lower end of the lever will be moved into the path of movement of bail 49.

Restore bail 44, tripping bail 49, and firing bail 43 are operated by cam means of a cam cluster 50 mounted on the machine main drive shaft 51. A cam follower 52 engaging cam means of cluster 50 through appropriate linkage and rocker means operates the bails in proper timed relation with the machine cycle.

During the first half of a machine cycle as racks 18 are moved in their forward excursions to set values into type wheels 19, restoring bail 44 will be rocked clockwise from engagement with hammers 35. Furthermore, tripping bail 49 will be rocked clockwise to engage levers 48 to release latches 45 in those orders where racks 18 have moved from their zero positions. As noted before, any released latch will release the next lower order latch by virtue of underlying lug 45*b*.

At mid-cycle, racks 18 will have completed their excursions and will dwell. During the mid-cycle dwell, firing bail 43 will be rocked counterclockwise to release hammer 35 and those hammers having their latches 45 released will be fired simultaneously to effect a printing operation. After the printing operation, the parts will be restored during the last half of the machine cycle. It will be noted that the above-described digit printing operation is conventional and well known in the art. The decimal printing operable therewith will now be described.

*The printing mechanism (decimal printing)*

In accordance with the present disclosure, the decimal mechanism is selectively settable to print from one to fourteen decimal digits. Furthermore, provision is made to print a decimal point to the right of the lowest order digit to indicate a whole number when there are no decimal digits. The mechanism therefore may be set to print a decimal point to the right of any one of the fifteen lowest order digits.

The mechanism as illustrated, in addition to printing the decimal point, provides for simultaneous printing of a point at the third and sixth positions to the left of the decimal point to mark the thousandths positions. The present invention however is not concerned with this operation the principle of which is disclosed in applicant's Patent No. 2,986,993.

Each decimal point type member 21 (FIGS. 1*a*, 3) is in the form of a slide having slot and pin mounting on one of the hammer plates 35 and having its lower end engaging a guide slot in the outwardly turned lug 35*a* at lower end of said plate. The upper end of slide 21 is stepped toward the right and extends upwardly to the right of digit type wheel 19 on plate 35. A decimal point type 21*t* is carried by the upper end of slide 21 and is thereby located to the right of the associated digit type wheel 19.

Normally slide 21 is spring held in a lowered position (FIG. 1*a*) with decimal type 21*t* below the printing line. Consequently, if hammer 35 is fired, type 21*t* will not be brought to the platen and the digit will be printed without a decimal to the right. Means is operable to adjust slide 21 to a raised position thereby enabling decimal type 21*t* by bringing it to printing line position as follows.

The upper edge of a slidably adjustable rocker 53 engages the lower end of each decimal slide 21. Rockers 53 are pivotally and slidably supported at their rear by a transverse rod 54 which passes through longitudinal slots at the rear of the rockers. The rockers are normally held toward the rear and counterclockwise by springs 56 with their lower front ends supported and located by a transverse rod 55. A guide comb 57 retains the rockers in lateral spaced relation.

Figures 3, 4:
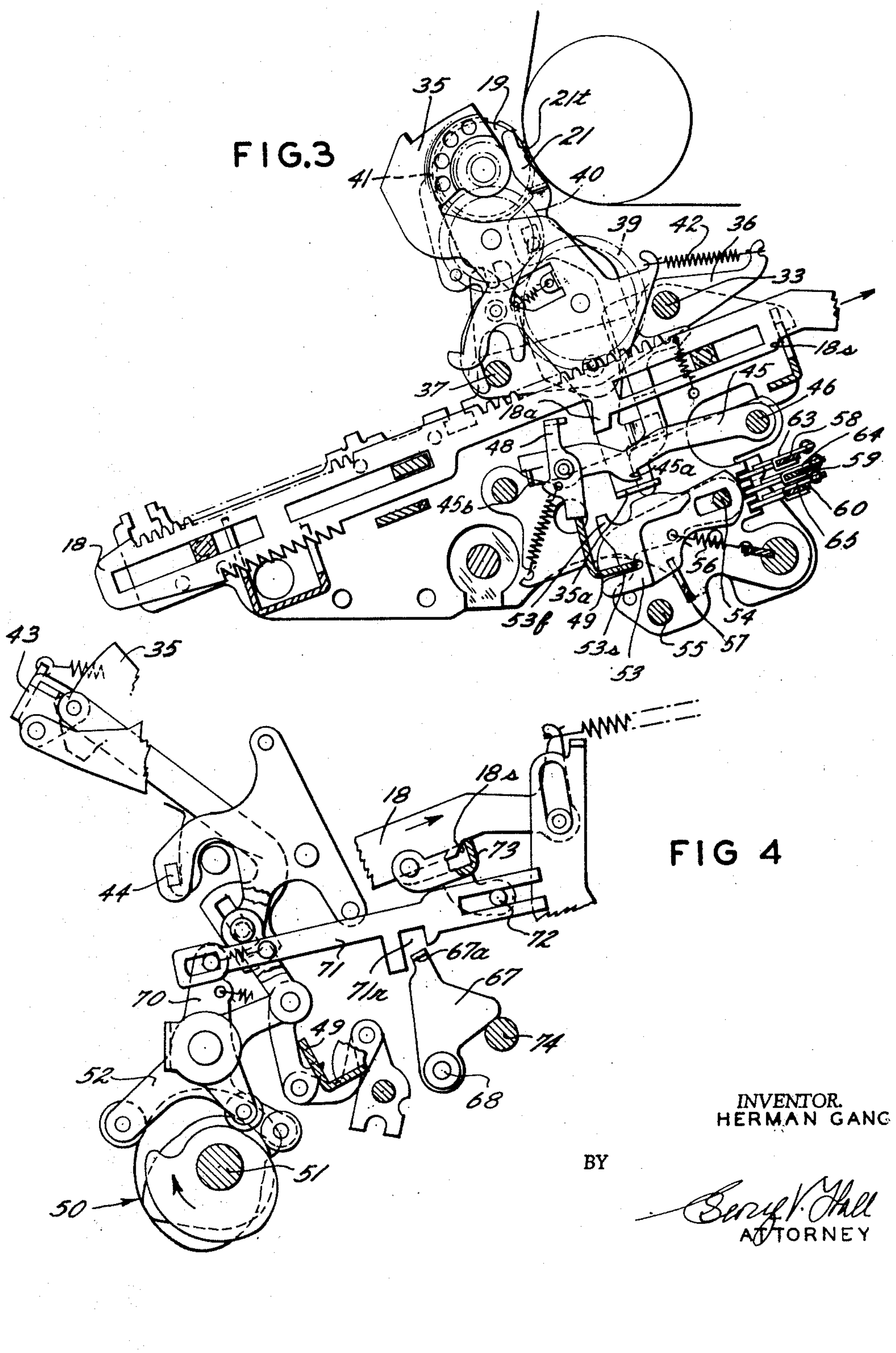
FIG. 3 is a detail side elevation of the printing mechanism including the decimal point selection means.
FIG. 4 is a side elevation of details of the decimal point selection means.

When rockers 53 are in normal rear counterclockwise position (FIG. 1*a*), an open end slot 53*s* at the front end of each rocker is aligned with and immediately to the rear of a rear edge of tripping bail 49. Consequently, bail 49 will be idly rocked with respect to rockers 53. If, however, a rocker is adjusted forwardly prior to operation of bail 49, slot 53*s* will engage the bail and couple rocker 53 for clockwise movement with said bail in its latch tripping operation (FIG. 3). Clockwise movement of rocker 53 will raise slide 21 and bring decimal type 21*t* to printing line position. Accordingly, if latch 45 of the associated hammer 35 is released, said hammer will be operated when released by firing bail 43 and the decimal point will be printed to the right of the digit.

It will be recalled that a trip lever 48 on latch 45 is adjusted clockwise into the path of movement of bail 49 if the associated rack 18 is moved from zero position, and the bail will then be effective to release said latch. When a rocker 53 is adjusted forwardly to enabled position, means is operable to release the related latch 45 should rack 18 remain in normal zero position. But for such provision, a decimal fraction wherein there is no significant digit to the left of the decimal and zeros immediately to the right would not be printed, e.g. (0.0025).

To provide for the above operation to release latch 45, an upstanding finger 53*f* is located on the front of rocker 53. When rocker 53 is adjusted forwardly to enabled position, finger 53*f* will be positioned beneath the lower end of trip lever 48 if said lever has not rocked clockwise into operating position with respect to bail 49 in response to movement of rack 18. As a result, clockwise movement of rocker 53 will release latch 45 and a zero will be printed with a decimal to the right. Furthermore, because of the overlapping lugs 45*b* any zeros to the right of the decimal will be printed.

*Selection means (decimal printing)*

Selection means is operable in time with each machine cycle, wherein one or more racks 18 are moved from zero position, to enable a selected one of rockers 53 for printing of a decimal point. If there is no movement of a rack, the selection means is disabled and a rocker 53 will not be enabled. The printing mechanism therefore will not be operated.

The selection means comprises three selectively operable selection bars 58, 59, 60 (FIGS. 1*a*, 3, 5*b*, 11) mounted to the rear and extending transversely of rockers 53. The bars are mounted in stacked relationship with bar 58 at the top, bar 59 in middle position and bar 60 at the bottom. Bar 58 is operable in the selection of a decimal type member 21 in the printing of a decimal point with a product or a dividend, bar 59 with a multiplicand or a divisor, and bar 60 with a multiplier or a quotient. In the mechanical schematic (FIG. 5*b*), the bars are shown in exploded plan view to show their longitudinal relationship with one another and with associated parts.

Bars 58, 59, 60 include forward extensions at each of their ends slidably engaging one another. The transverse longitudinal section of bar 58 is stepped upwardly at each of its ends whereas the longitudinal section of bar 60 is steppped downwardly. The transverse sections of the bars are therefore in vertically spaced relationship.

Figure 5B:
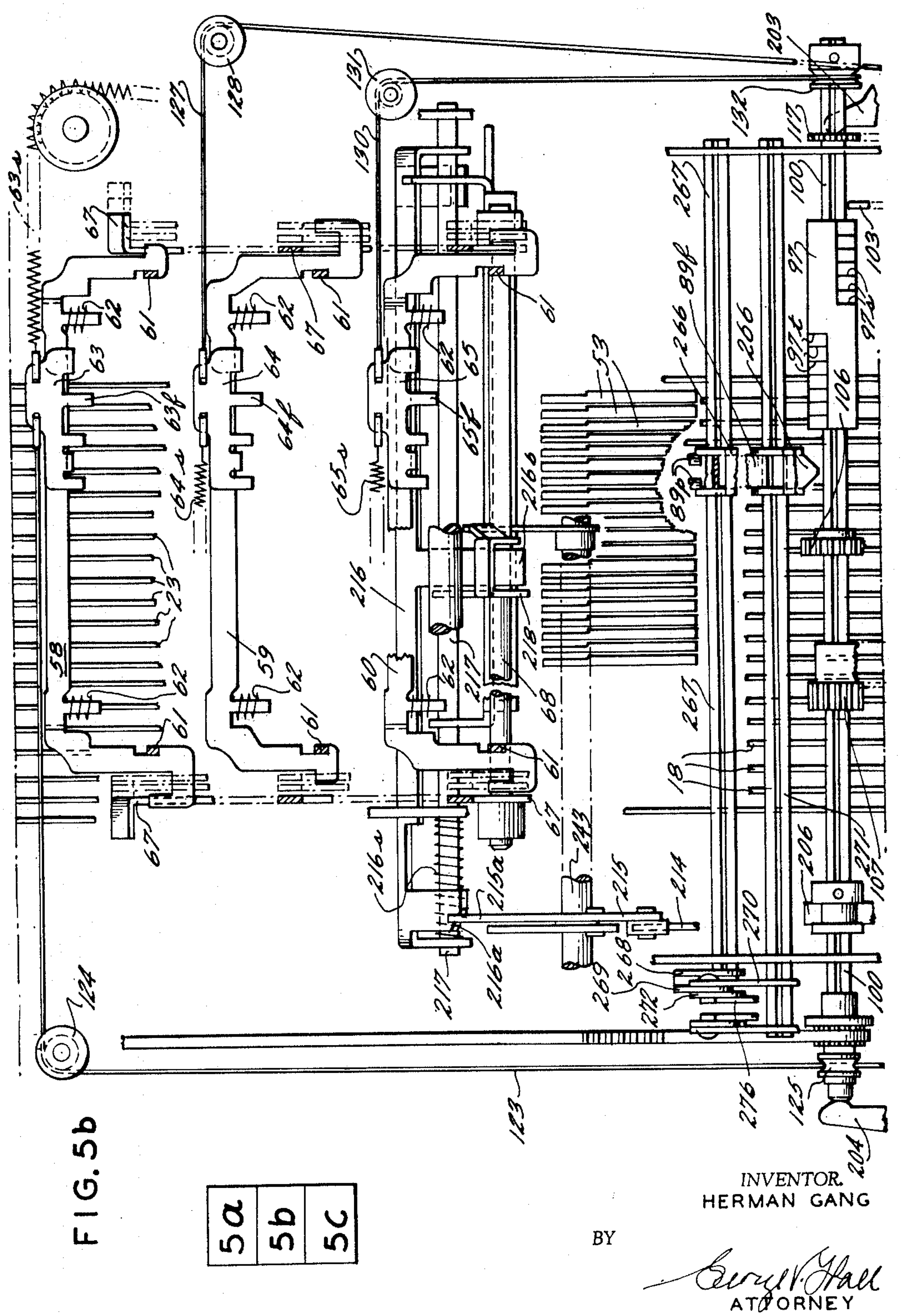

The bars are supported adjacent their ends by brackets 61 (FIGS. 5*b*, 11). The brackets are provided with suitable slots engaged by the bars and which permit the bars independent front and rear sliding movement. The bars are normally held to the rear by compression springs 62 and are powered toward the front of the machine in operating strokes as later described.

Selection slides 63, 64, 65 respectively are adjustably mounted on bars 58, 59, 60 and have forwardly extending fingers 63*f*, 64*f*, 65*f* each of which is adapted to enable a rocker 53. To the left of each finger 63*f*, 64*f*, 65*f* are two fingers of shorter length. These shorter fingers are operable to enable rockers 53 for printing a period to mark the thousandths positions and with which operation we are not herein concerned.

Each finger 63*f*, 64*f*, 65*f* is immediately to the rear of a rocker 53 depending on the adjusted position of the respective slides 63, 64, 65 on bars 58, 59, 60. Therefore, if a bar is moved forwardly in an operating stroke, a finger will move a rocker 53 forwardly to enabled position as previously described.

Selection slide 65 is adjusted ordinally upon adjustment of decimal dial 6 (FIGS. 2, 5*c*) to provide the number of decimal digits indicated by the setting of the dial, slide 64 is adjusted ordinally upon adjustment of decimal dial 7 to provide the number of decimal digits indicated by the setting of the dial, and slide 63 is adjusted ordinally upon adjustment of both decimal dials 6, 7 to provide the number of decimal digits indicated by the sum of the settings of the two dials. Transmission trains for setting slides 63, 64, 65 upon adjustment of dials 6, 7 will be described in a following selection of the specification.

Means is selectively operable in each printing cycle to drive a selected one of bars 58, 59, 60 in a forward operating stroke. This operating means comprises a pair of upstanding drive arms 67 (FIGS. 4, 5*b*) fast at their lower ends on a shaft 68 and having their upper ends adjacent the respective ends of bars 58, 59, 60. Shaft 68 with arms 67 is adapted for rocking operation, and shaft 68 is mounted for longitudinal adjustment to operatively locate arms 67 with respect to a selected one of bars 58, 59, 60.

Shaft 68 is adjustable longitudinally toward the right from a normal leftmost position, to an intermediate position, or to a rightmost position. Shaft 68 will remain in normal position, or be adjusted to its intermediate or to its rightmost position in response to depression of aforenoted function keys which respectively control the adjusting operation, or in response to initiation of total taking operations. The means for adjusting shaft 68 will be described in a following section of the specification.

When shaft 68 is in normal leftmost position, a lug at each end of bar 58 is in the path of forward counterclockwise rocking movment of respective arms 67 as shown by the full line position of FIG. 5*b*. However, lugs at the ends of bars 59 and 60 are out of the path of movement of arms 67. As a result, when arms 67 and shaft 68 are rocked, the arms will drive bar 58 forwardly and finger 63*f* will likewise move an aligned rocker 53 forwardly to coupled position with respect to bail 19. This operation will result in printing of the decmal point as previously described.

In the intermediate position of shaft 68, arms 67 will be effective to engage the lugs of bar 60, as shown by the dot-dash line position of FIG. 5*b*, to drive said bar forwardly while the lugs of bars 58, 59 will be out of the path of movement; and in the rightmost position of shaft 68, arms 67, again shown in dot-dash, will be effective to engage the lugs of bar 59 to drive this bar forwardly while the lugs of bars 58, 60 wil be out of the path of movement. Drive means for rocking arms 67 and shaft 68 operate as follows.

A cam follower 70 (FIG. 4) engaging cam means of cluster 50 operates a rearwardly extending link 71. An open end slot at the rear of link 71 is engaged by a pin 72 carried by a bail 73. Bail 73 extends transversely beneath racks 18 and is spring urged upwardly to engage the racks immediately to the rear of a shoulder 18*s* on each rack. A recess 71*r* in the lower edge of link 71 is immediately above a lug 67*a* of the right arm 67 when the parts are in normal position. Arm 67 is trapped between a rod 74 and a downwardly extending lug on link 71 to accurately locate lug 67*a* with respect to recess 71*r*.

Shortly after racks 18 are moved in their forward excursions, link 71 is powered forwardly by cam follower 70 operated by the cam means of cluster 50. Shoulder 18*s*, of any rack upon forward movement, will rock bail 73 to lower the rear of link 71 to engage recess 71*r* with lug 67*a*; and therefore arms 67 and shaft 68 will be rocked counterclockwise to enable a selected rocker 53 which in turn will enable the associated decimal point type member 21. After the printing operation, the parts will be restored as the cycle is completed.

If, in a machine cycle, a rack 18 is not moved from zero position, link 71 will be idly operated in raised position. But for this provision, a decimal type member and associated digit type member would be enabled to print a zero with a decimal to the right and zero in all lower orders.

*The selector carriage (indexing and restoring operations)*

Selector carriage 2 (FIGS. 1*a*, 5*c*, 6, 7) is biased toward the left by a spring 75 and is normally restrained in right home position by an escapement mechanism later described.

Carriage 2 includes a pair of end plates 76 between which selector gears 20 are mounted on a shaft 77. Numeral wheels 5 which register the values set in selector gears 20 are entrained with the selector gears by wheel gear 78 and intermediate gear 79. The carriage including the above parts in shiftably mounted in well-known manner on suitable rails and shafting.

Figure 5C:
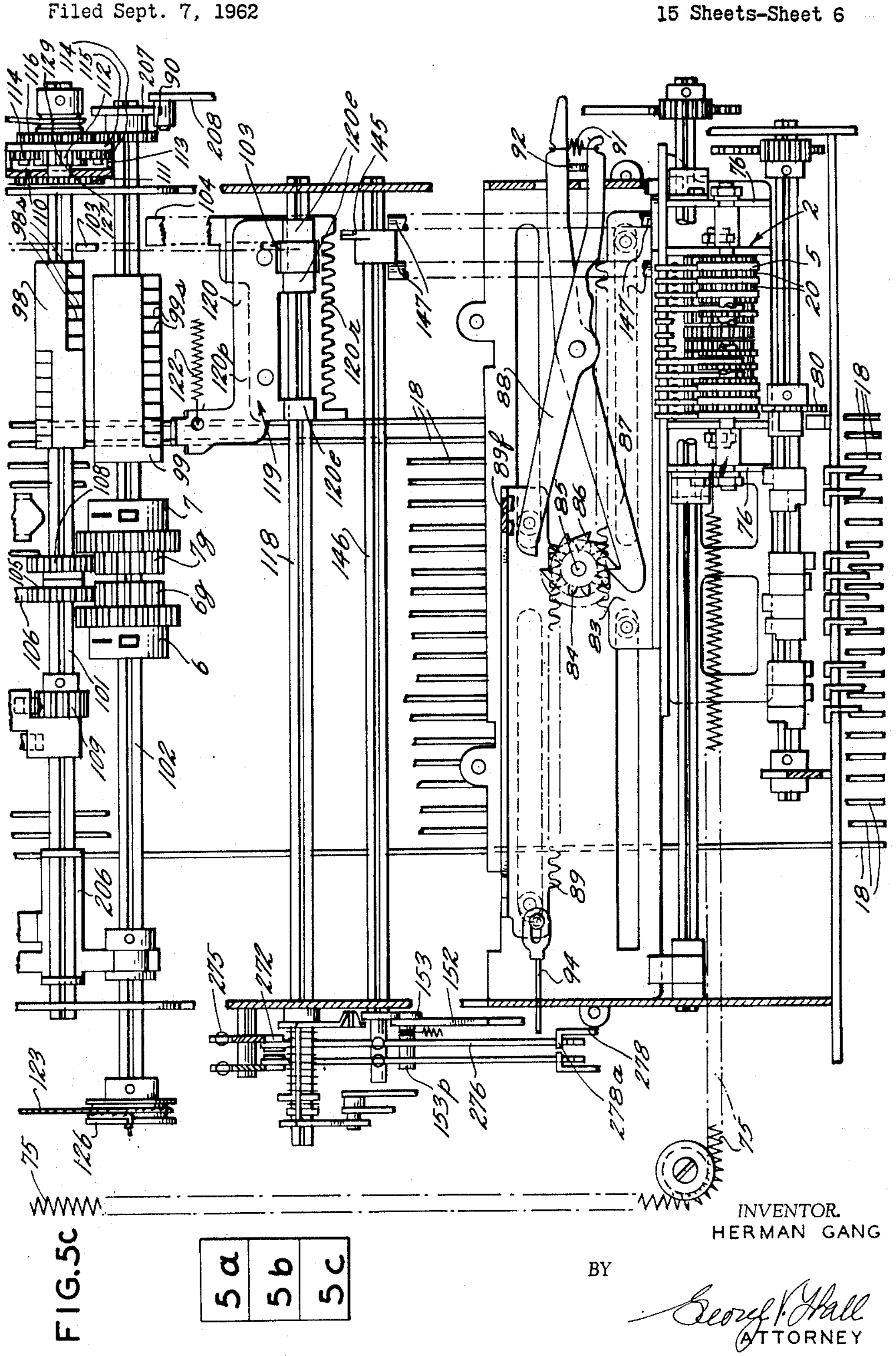

As previously noted, when carriage 2 is in right home position, the highest order selector gear 20 is one ordinal position to the right of the lowest order rack 18. Furthermore, the highest order intermediate gear 79 is in the plane of a mutilated setting gear 80 (FIG. 5*c*).

Upon depression of each digit key 1, means is operable to engage a clutch 82 for a single cycle of operation. Means operable by the clutch during its cycle will rock setting gear 80, a number of degrees determined by control means which is set upon depression of the digit key, to enter a value into the related selector gear 20 corresponding to the value of the depressed key. Furthermore, the clutch, subsequent to the value entering operation, will operate the carriage escapement to shift the carriage one ordinal position to the left. Accordingly, upon successive depression of digit keys 1, values will be set into selector gears 20 from higher to lower orders and the set gears will be shifted into controlling position with respect to racks 18 from lower to higher orders.

The invention is not concerned with the control of the operation of clutch 82 nor of operation of the means for setting selector gears 20, and reference is made to applicant's application 772,499 for a complete disclosure of these operations. The invention, however, is concerned with control of the escapement upon depression of a function control key to release the carriage for left shift movement until arrested in a selected ordinal position as determined by the devices of the invention.

The carriage escapement mechanism includes a rack 83 (FIG. 5*c*) secured transversely on the rear of carriage 2. A gear 84 engages rack 83 and is fast on a vertical shaft 85 rotatably supported in the machine framing. Fast on shaft 85 above gear 84 is a ratchet wheel 86 which is adapted for alternate engagement by the toothed left ends of a pair of escapement levers 87, 88 fulcrumed in scissor-like arrangement on the machine frame.

Levers 87, 88 have their right ends extending outwardly through slots in a right side frame of the machine. A spring 91 connecting the right ends of levers 87, 88 biases said levers respectively clockwise and counterclockwise normally to engage the opposite sides of the upper end of a lever 92 (FIG. 6) which constitutes a cam follower having its lower end engaging a cam 93 driven by clutch 82.

Cam follower 92 is spring urged counterclockwise normally to engage a low portion of cam 93. When follower 92 is in normal counterclockwise position, escapement levers 87, 88 will be held clockwise (FIG. 5*c*) with the toothed left end of lever 87 engaged by a tooth of ratchet wheel 86 and the toothed end of lever 88 disengaged from the wheel. Ratchet wheel 86 therefore will be restrained from clockwise rotation and carriage 2 will be restrained from left shift movement.

Upon rotation of cam 93, its high portion will rock follower 92 clockwise. This will rock lever 87 counterclockwise to release ratchet wheel 86 whereas lever 88 will be rocked counterclockwise to bring its left end into the path of movement of a tooth of said wheel. Thus carriage 2 will be released for a one-half ordinal step of left shift movement under the urge of spring 75. As clutch 82 continues its cycle, the low portion of cam 93 will reengage follower 92 which will then be restored counterclockwise and levers 87, 88 clockwise. This will again release carriage 2 which will complete the step of ordinal left shift movement.

Means, later described, is operable to rock lever 87 counterclockwise independently of lever 88. This will release carriage 2 for uninterrupted left shift to a predetermined selected ordinal position under control of devices of the invention.

Means is operable in a machine cycle to restore carriage 2 to its right home position after a printing operation. The restoring means includes a rack 89 engaging gear 84 in opposition to rack 83. A cable 94 attached to the left end of rack 89 extends toward the left around a pulley 95 (FIG. 8) mounted on the left side frame of the machine. From pulley 95, cable 94 extends forwardly and around a pulley 96 mounted at the upper end of a lever 136 which is fulcrumed near the front of the machine on the left side frame and which is biased clockwise by a strong spring 136*s*. From pulley 96, cable 94 extends toward the rear and around a pulley 137 mounted at the upper end of an upstanding arm 138 which is pivotally mounted at its lower end near the rear of the machine left side frame and which is biased counterclockwise by a weak spring 138*s*. From pulley 137, cable 94 extends forwardly and around a hub of an upstanding arm 139 and to which hub it is attached. Arm 139 is pivotally mounted at its lower end on the left side frame intermediate pulleys 96, 137 and is normally held clockwise by a spring 139*s*.

A cam follower 142 has common pivotal mounting with arm 138 and is normally held clockwise by a spring 142*s* to engage the low portion of a cam 143 which is fast on the machine main drive shaft 51. With follower 142 in normal clockwise position and arm 138 counterclockwise, a pin 138*p* and arm 138 will be located near the rear end of an arcuate slot in follower 142.

When carriage 2 is in right home position, weak spring 138*s* holding arm 138 counterclockwise will thereby hold cable 94 taut, while lever 136 and arm 139 are held clockwise by their springs 136*s*, 139*s*, against the relatively light urge of spring 138*s*. In the carriage restoring operation, described in the following, spring 136*s* is designed to yield only in event of a jam in the mechanism or slightly as the carriage is moved to home position to insure completion of the restoring operation. Therefore for the purposes of the description, pulley 96 may be considered to have a fixed location.

As carriage 2 is shifted toward the left under the urge of spring 75, rack 89 with attached cable 94 will be moved toward the right. In this operation, weak spring 138*s* will yield and arm 138 will be rocked clockwise whereby moving its pin 138*p* toward the front of the slot of follower 142.

When the machine is cycled, counterclockwise rotation of main drive shaft 51 will bring the high portion of cam 143 to engagement with follower 142 shortly after operation of the printing mechanism, and the follower will be rocked counterclockwise to engage the front end of its slot with pin 138*p* of arm 138 to restore the arm counterclockwise. The counterclockwise movement of arm 138 will, through cable 94, first rock arm 139 counterclockwise against the urge of spring 139*s*. This movement of arm 139 is operable in connection with the devices of the invention as later described.

At the limit of the counterclockwise movement of arm 139, the pull on cable 94 will move rack 89 toward the left thereby restoring carriage 2 toward the right against the urge of spring 75; escapement lever 87 yielding to the beveled sides of the teeth of rachet wheel 86. As the machine completes the cycle, carriage 2 will be restored to home position and follower 142 will rock clockwise from the high to the low portion of cam 143. This will release arm 138, and arm 139 will be restored clockwise by spring 139*s* which will overcome spring 138*s* to rock arm 138 slightly clockwise.

*Carriage shift stop means*

Selectively settable stop means is operable to terminate left shift of carriage 2 in position for entry into the machine and printing of a factor (multiplicand, multiplier, dividend or divisor) with a decimal point which is printed at a position to provide a given number of decimal digits as determined by the setting of the previously described decimal point selection means.

Figures 1A, 2:
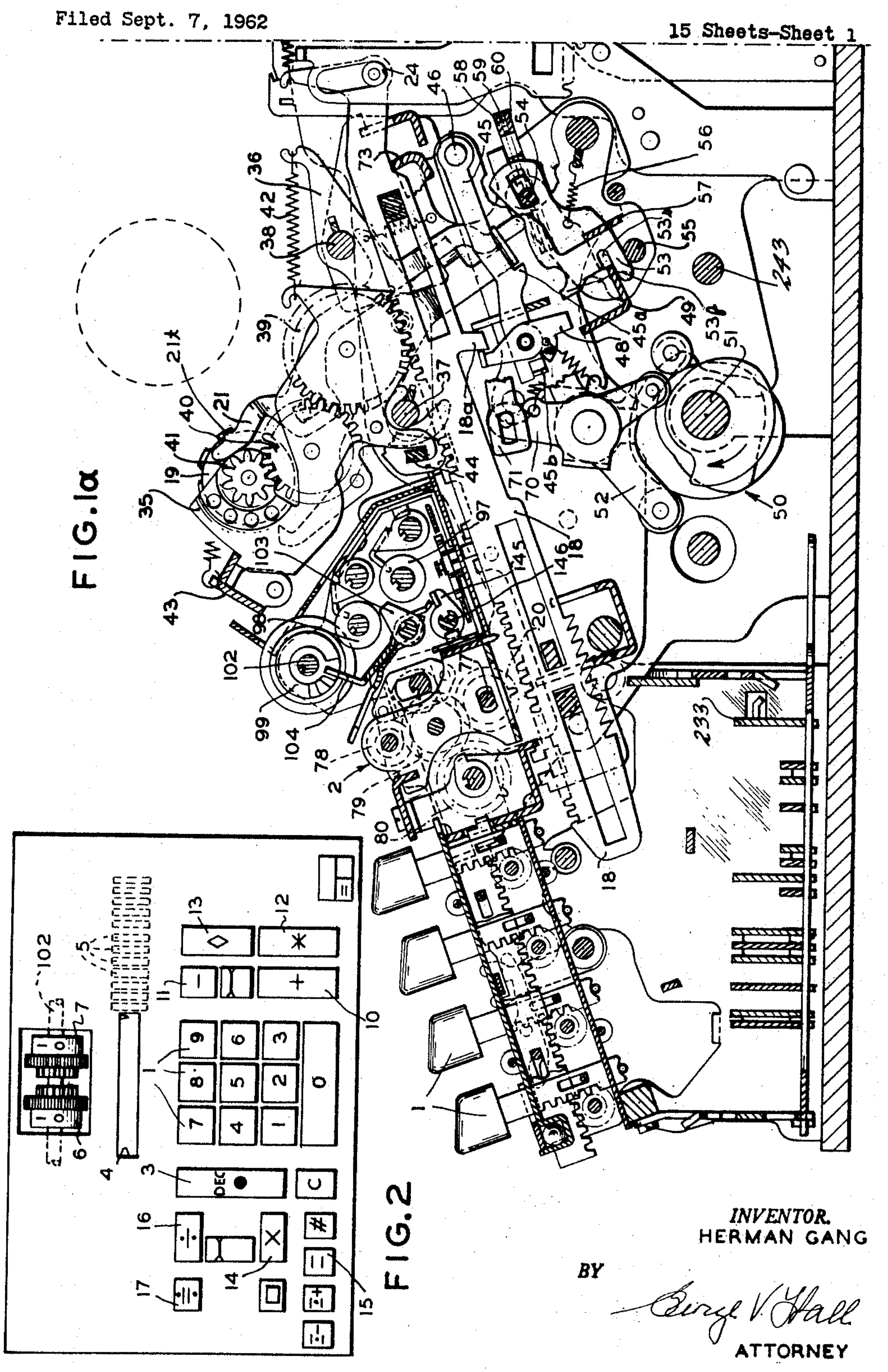
FIG. 2 is a plan view of the keyboard.

Both the stop means and the decimal point selection means are selectively set to corresponding positions upon manual setting of decimal dials 6 and 7 (FIGS. 2, 5*c*.). Furthermore, entry and printing of the factors with the decimal point to provide selected numerals of decimal digits results in registration and printing of the result with the decimal point according to the arithmetical law, i.e., the number of decimal digits in a product is equal to the sum of those in the multiplicand and multiplier whereas the number of demical digits in a quotient is equal to the difference of those in the dividend and divisor.

The stop means includes selectively settable lower, intermediate and upper stepped drums 97, 98, and 99 (FIGS. 1*a*, 5*b*, 5*c*, 7) fixed on transversely extending shafts 100, 101 and 102 respectively which are fulcrumed and slidably mounted adjacent their ends in the machine framing. In the mechanical schematic of FIGS. 5*b*, 5*c*, the parts are shown in a single plane as noted previously. Drum 97 is adapted for engagement by a stop arm 103 to terminate a left shift of carriage 2 in position for entry and printing of a multiplier with a decimal point located and provide a preselected number of decimal digits. Drum 98 is adapted for engagement by arm 103 to terminate a left shift of the carriage in position for entry and printing of a multiplicand or a divisor with a decimal point located to provide a preselected number of decimal digits. And drum 99 is adapted for engagement by a stop arm 104 to terminate a left shift of carriage 2 in position for entry and printing of a dividend with a decimal point located to provide a preselected number of decimal digits.

As will be described later, stop arms 103, 104 are normally in a right home position and are adapted to be simultaneously coupled for left shift movement with carriage 2 upon depression of decimal key 3 (FIG. 2) or upon depression of a function control key 14–17 if the decimal key has not been depressed. Furthermore, arm 103 is normally in an ineffective central position (FIGS. 1*a*, 7) with respect to drums 97, 98 and is adapted to be rocked clockwise upon depression of multiplier entry key 15 for movement with carriage 2 in a path to engage drum 97, and is adapted to be rocked counterclockwise upon depression of multiplicand entry key 14 or divisor entry 17 for movement with the carriage in a path to engage drum 98. Arm 104 however is shifted with carriage 2 in a fixed path to engage drum 99.

Drums 97 and 98 are each selectively settable to terminate left shift of carriage 2 in position for entry and printing of a value including from one to seven decimal digits, whereas drum 99 is settable for the entry and printing of from two to fourtten decimal digits, i.e., the sum of the settings of drums 97, 98. Arm 103 is normally one ordinal carriage position to the right of drums 97, 98 (FIGS. 5*b*, 5*c*). The right end of each drum 97, 98 is thereby adapted for engagement by arm 103 when coupled with carriage 2 to terminate the left carriage shift after one ordinal step of movement to provide for one decimal digit. Each drum 97, 98 therefore has six spirally arranged steps 97*s*, 98*s* which, upon rotation of the drums, are brought successively into position for engagement by arm 103 to arrest left shift movement of carriage 2 after two, three, etc., respective ordinal steps of left shift movement.

Drum 97 is rotated to a selected position by manually settable decimal tial 6. Dial 6 is loosely mounted on shaft 102 on which drum 99 is fast and includes a knurled wheel for manual rotation. The knurled wheel engages a slot in a key plate of the machine to axially locate dial 6. A gear 6*g* is integral with dial 6 and engages a gear 105 loosely mounted on shaft 101, and gear 105 engages a gear 106 fixed on shaft 100 on which drum 97 is fixed. The gear ratio of the above train is one to one, and therefore rotation of dial 6 will rotate drom 97 the same angular distance in the same direction.

Dial 6 is settable counterclockwise (FIG. 7) from 0–7 positions inclusively spaced at 40° intervals. Steps 97*s* are therefore in a clockwise spiral from the right end of drum 97 at an angular spacing of 40° and spaced longitudinally of the drum a distance equal to one ordinal shift of carriage 2. When dial 6 is in the 1 decimal digit position, the right end of drum 97 is in the path of arm 103 when said arm is adjusted clockwise. When the dial is in the 2–7 positions the corresponding steps 97*s* respectively are in the path of arm 103. Appropriate detent means 107 on shaft 100 is operable to locate dial 6 and drum 97 in adjusted position.

Drum 98 is rotated to a selected position by manually settable decimal dial 7 which is loosely mounted on shaft 102 to the right of dial 6. Dial 7 like dial 6 includes a knurled wheel for manual rotation and which also engages a slot in the aforenoted key plate to axially locate said dial. A gear 7*g* is integral with dial 7 and engages a gear 108 fixed on shaft 101 on which drum 98 is fixed. The gear ratio of gears 7*g*, 108 is one to one, and therefore rotation of dial 7 will rotate drum 98 the same angular distance in the reverse direction.

Dial 7 like dial 6 is settable counterclockwise (FIG. 7) from 0–7 positions inclusively spaced at 40° intervals. Steps 98*s* are therefore in a counterclockwise spiral from the right end of drum 98 at an angular spacing of 40° and spaced longitiudinally of the drum a distance equal to one ordinal shift of carriage 2. When dial 7 is in the 1 decimal digit position, the right end of drums 98 is in the path of arm 103 when said arm is adjusted counterclockwise. When the dial is in the 2–7 positions the corresponding steps 98*s* respectively are in the path of arm 103. Appropriate detent means 109 on shaft 101 is operable to locate dial 7 and drum 98 in adjusted position.

When dials 6, 7 are in 0 position, the ends of drums 97, 98 are one ordinal carriage shift position to the left of arm 103 in home position. However, with the dials in 0 position, the automatic decimal system is disabled and a decimal point is printed to the right of one or more whole number digits. Also the automatic decimal system is disabled with dials 6, 7 in the 1 position, and when the dials are so adjusted the machine is intended for use as an adding machine with a demical point printed to mark dollars and cents. The automatic decimal system is usable when either dial 6, 7 is set to at least the 1 position and the other dial is set to a position greater than 1. The disablement and enablement of the system will be described later.

It has been noted that drum 99 is set to a position corresponding to the sum of the settings of drums 97, 98. This operation is effected by a planetary differential 110 (FIGS. 5b, 5c, 9). The planetary is of well-known construction and includes an input gear 111 loosely mounted on shaft 101 and an input sun gear 112 fixed on shaft 101. A gear 117 fast on shaft 100 engages input gear 111. An internal gear 113 is concentric and fixed for rotation with input gear 111. A pair of diametrically opposed planet gears 114 engage sun gear 112 and internal gear 113. Planet gears 114 are mounted on a plate 115 which is rotatable on shaft 101 and which carries an output gear 116 of the differential. Output gear 116 engages a gear 90 fast on shaft 102 on which drum 99 is fast.

Counterclockwise rotation of drum 97 from 0 position will, through differential 110, rotate drum 99 counterclockwise from 0 position, and clockwise rotation of drum 98 from 0 also will likewise rotate drum 99 counterclockwise from 0. The gear ratio of the differential and transmissioin gears provides that drum 99 will be rotated one-half the angular distance of each drum 97, 98. Drum 99 is set for one decimal digit for each decimal digit for which either drum 97, 98 is set, i.e., the sum of the settings of drums 97, 98. Steps 99s therefore are in a clockwise spiral from the right end of drum 99 at an angular spacing of 20° and spaced longitiudinally of the drum a distance equal to one ordinal shift of carriage 2. When dials 6 and 7 are in the 1 decimal digit position, the right end of drum 99 is in the path of arm 104 thereby providing for two decimal digits (FIG. 5c). When dial 6 is in the 1 position and dial 7 is in the 2 poistion the first step 99s is in the path of arm 104 to provide for three decimal digits, etc. Accordingly, the successive steps 99s are brought into controlling position with successive steps 97s or 98s.

Arm 103 has a hub splined on a shaft 118 which extends transversely of the machine and is fulcrumed for rocking movement in the machine side frames. Arm 103 therefore will be rocked with shaft 118 and is slidable longitudinally thereon.

It will be noted that when arm 103 is rocked clockwise or counterclockwise from ineffective control position to carriage shift control position with respect to drum 97 or drum 98 there can be no interference by arm 104 in conjunction with drum 99 because the setting of drum 99 will always provide for the sum of the settings of drums 97, 98. Furthermore, when arm 103 is in central position, arm 104 in conjunction with drum 99 will determine the number of decimal digits. Arms 103, 104 are carried by a stop carriage generally indicated by the reference numeral 119 (FIGS. 5c, 7) and which is constructed as follows.

Arm 104 extends from the upper right end of a plate 120 which includes a rack 120r at its lower edge. Plate 120 is bent to form a longitudinal trough above rack 120r and there engages the rear of shaft 118. A complementary plate 120p is secured to the front of plate 120 and has curved ears 120e at its lower edge embracing the front of shaft 118 opposite the trough of plate 120. The hub of arm 103 is trapped between a pair of the ears 120e adjacent the right end of plate 120p and a slot in plate 120.

The upper edge of plate 120p is bent outwardly from plate 120 to form a longitudinal slot which is engaged by a fixed rail 121 to slidably support plates 120, 120p at their top. Therefore the unit comprising plates 120–120p, rack 120r, arm 103 and arm 104 are shiftable on shaft 118 and rail 121. Furthermore, arm 103, in any shifted position, is rocked with shaft 118. Normally the above unit which constitutes stop carriage 119 is held in right home position by a spring 122 attached to plate 120p. Means is operable upon depression of decimal key 3 (FIG. 2) to couple the stop carriage for left shift movement with selector carriage 2 or is operable upon depression of machine function keys 14–17 if the decimal key has not been depressed. These operations will be described later.

*Setting the decimal point printing selection means*

Selection slides 63, 64, 65 (FIGS. 5b, 5c, 8, 9) for the decimal printing means are set respectively to positions corresponding to the settings of stepped drums 99, 98, 97.

Slide 63 is biased toward the right by a spring 63s. A cable 123 attached to slide 63, extends toward the left around a pulley 124, forwardly and under a pulley 125 loosely mounted on shaft 100 adjacent its left end, and over and around a pulley 126 to which it is attached. Pulley 126 is fixed on shaft 102 adjacent its left end and on which shaft drum 99 is fixed. Therefore rotation of drum 99 counterclockwise (FIG. 7) from its 0 setting will, through cable 123, move slide 63 toward the left against the tension of spring 63s, whereas rotation of the drum clockwise toward 0 setting will permit the spring to restore the slide toward the right.

When drum 99 is in its 0 position, slide 63 will be set in its rightmost position wherein finger 63f is aligned immediately to the rear of the rightmost selection rocker 53. Therefore, if, in a printing cycle, selection bar 58 is powered forwardly as previously described, finger 63f will enable the aligned rocker 53 and a decimal point will be printed to the right of the rightmost digit thereby indicating a whole number without decimal digits. For each step of counterclockwise rotation of drum 99, slide 63 will be stepped one ordinal position to the left in alignment with the next higher order rocker 53. Accordingly, a decimal point will be printed in position to provide a number of decimal digits equal to the number provided for by the setting of drum 99.

Slide 64 is biased toward the left by a spring 64s. A cable 127 attached to slide 64, extends toward the right and around a pulley 128, and forwardly and over and around a pulley 129 to which it is attached. Pulley 129 is fixed on 101 adjacent its right end and on which shaft drum 98 is fixed. Therefore rotation of drum 98 clockwise (FIG. 7) from its 0 setting will release cable 127, and slide 64 will be moved toward the left by spring 64s, whereas rotation of the drum counterclockwise toward 0 setting will, through cable 127, restore the slide to the right against the tension of the spring.

When drum 98 is in its 0 position, slide 64 will be set in its rightmost position wherein finger 64f is aligned immediately to the rear of the rightmost selection rocker 53. Therefore, if, in a printing cycle, selection bar 59 is powered forwardly as previously described, finger 64f will enable the aligned rocker 53 and a decimal point will be printed to the right of the rightmost digit thereby indicating a whole number without decimal digits. For each step of clockwise movement of drum 98, slide 64 will be stepped one ordinal position to the left into alignment with the next higher order rocker 53. Accordingly, a decimal point will be printed in position to provide a number of decimal digits equal to the number provided for by the setting of drum 98.

Slide 65 is biased toward the left by a spring 65s. A cable 130 attached to slide 65, extends toward the right and around a pulley 131, and forwardly and under and around a pulley 132 to which it is attached. Pulley 132 is fixed on shaft 100 adjacent its right end and on which shaft drum 97 is fixed. Therefore rotation of drum 97 counterclockwise from its 0 setting will release cable 130, and slide 65 will be moved toward the left by spring 65s, whereas rotation of the drum clockwise toward 0 setting will, through cable 130, restore the slide to the right against the tension of the spring.

When drum 97 is in its 0 position, slide 65 will be set in its rightmost position wherein finger 65f is aligned immediately to the rear of the rightmost rocker 53. Therefore if, in a printing cycle, selection bar 60 is powered forwardly as previously described, finger 65f will enable the aligned rocker 53 and a decimal point will be printed to the right of the rightmost digit thereby indicating a whole number without decimal digits. For each step of counterclockwise movement of drum 97, slide 65 will be stepped one ordinal position to the left into alignment with the next higher order rocker 53. Accordingly a decimal point will be printed in position to provide a number of decimal digits equal to the number provided for by the setting of drum 97.

*The decimal key*

Decimal key 3 (FIGS. 2, 10) as noted before is adapted to be depressed in proper decimal sequence with digit keys 1 when a value including decimal digits is entered into selector carriage 2 (FIGS. 5c, 7), and depression of the key will effect coupling of stop carriage 119 which carries arms 103 and 104 for left shift movement with the selector carriage.

The coupling means includes a finger 145 adapted to engage rack 120r of stop carriage 119. Finger 145 includes a hub portion which is splined on a transverse shaft 146 which is rotatably mounted in the machine side frames. Finger 145 therefore is adapted to be rocked with shaft 146 and is longitudinally shiftable thereon. A pair of pins 147 project from the rear of carriage 2 and the hub of finger 145 is trapped between these pins. Therefore finger 145 is shifted with carriage 2, and if the finger is engaged with rack 120r, stop carriage 119 will be coupled and shifted therewith.

Finger 145 is normally in clockwise position (FIGS. 7, 10) beneath rack 120r. There is a tooth space of rack 120r for each digit position of selector carriage 2 and a tooth space for home position. The digit capacity of carriage 2 is twelve, and therefore rack 120r has thirteen tooth spaces (FIG. 5c) which may be engaged by coupling finger 145.

When carriages 2, 119 are in right home position, finger 145 is aligned beneath the rightmost tooth space of rack 120r. As carriage 2 is step shifted toward the left, finger 145 is shifted into alignment with the successive tooth spaces. Upon depression of decimal key 3, finger 145 is rocked counterclockwise to engage a tooth space thereby coupling stop carriage 119 for left shift with selector carriage 2 as follows.

Decimal key 3 is freely retractable and a rear shoulder of its key stem overlies a bail 148 (FIGS. 10, 12) which is loosely mounted for rocking and sliding movement on a transverse shaft 149 which is supported in the machine side frames. Bail 148 is normally held clockwise and toward the left by a spring 150.

A finger 148f projects downwardly to the rear from bail 148 and engages a forwardly projecting lug 151a at the lower end of a depending arm 151 loosely mounted at its upper end on shaft 149. A rearwardly extending link 152 is pivotally connected at its front to the lower end of the arm 151, and at its rear, the link is pivotally mounted to the lower end of a depending arm 153 which is fast at its upper end on shaft 146 on which finger 145 is mounted. A spring 154 holds link 152 forwardly with arm 151 clockwise to engage lug 151a with finger 148f and finger 145 clockwise from engagement with rack 120r.

Depression of decimal key 3 will rock bail 148 counterclockwise, and finger 148f will likewise rock arm 151 thereby moving link 152 toward the rear to rock arm 153, shaft 146 and finger 145 counterclockwise to engage rack 120r thereby coupling selector carriage 2 and stop carriage 119.

A latch 156 (FIG. 8) is operable to hold bail 148 rocked upon release of decimal key 3 to maintain the coupling of carriages 2, 119. Latch 156 is pivotally mounted on the left side frame and includes a downwardly extending arm having a latching shoulder adjacent its lower end. Latch 156 is spring biased counterclockwise normally to engage its shoulder with the side of an ear 148e projecting to the left from an arm integral with bail 148. When bail 148 is rocked clockwise (FIG. 8) to coupling position, the shoulder of latch 156 will move counterclockwise beneath ear 148e to latch the bail.

After depression of decimal key 3, the decimal digits will be entered into carriage 2. Then a machine function key will be depressed. In accordance with the disclosure, this key may be the multiplicand entry key 14, the multiplier entry key 15, the dividend entry key 16 or the divisor entry key 17. The operations stemming from depression of each of these keys will be described later.

Although this section of the specification is directed primarily to operation of decimal key 3, it is believed to be appropriate to include coupling of carriages 2, 119 upon depression of function keys 14, 15, 16, and 17 because of the related operation.

If a value entered into carriage 2 does not include a decimal digit, decimal key 3 will not be depressed. Any one of the function keys 14–17 however will effect the coupling of carriages 2, 119. This is necessary so that carriage 2 may be controlled in subsequent left shift movement to add zeros to the right of the whole number value to thereby ordinally relate the value to the fixed decimal point which provides for a given number of decimal digits.

The operation of function keys 14–17 to effect the coupling operation is substantially identical to the operation described above for decimal key 3. A rear shoulder of the stem of each key 14–17 overlies bail 148 (FIG. 12) which will therefore be rocked upon depression of any one of the keys to effect the coupling operation.

Among other operations performed in response to depression of any one of the function keys is engagement of the machine main clutch 135 (later described) which drives main drive shaft 51. The operation of the clutch, however, will be interrupted at 30° in a cycle. During this 30° operation, certain program control devices are set and selector carriage 2 with coupled stop carriage 119 is released from the escapement for left shift movement as later described.

The carriages will be shifted toward the left in one uninterrupted movement until arrested by engagement of stop arm 103 with stop drum 97 or drum 98, or by engagement of stop arm 104 with drum 99 depending on which function key is depressed. The engaged drum and the shaft on which it is mounted will be shifted a slight distance to the left in the arresting operation and this movement will reengage clutch 135 to complete its cycle of operation as later described. During this operation of clutch 135, racks 18, 23 will be operated under control of selector carriage 2 to enter the selected value into the machine in well-known manner and the value will be printed with the decimal point in accordance with the setting of the active drum 97, 98, or 99.

*Multiplication (multiplicand entry and printing)*

To set the decimal system for a series of multiplication operations, the operator will determine the maximum number of decimal digits in any multiplicand and the maximum number in any multiplier. Decimal dial 7 (FIGS. 2, 5c) for multiplicands and decimal dial 6 for multipliers will then be set accordingly. These settings as previously described will provide for a number of decimal digits in the products equal to the sum of those in the factors. It will be seen that when a factor or product has fewer decimal digits than provided for by the settings, zeros are automatically added at the right to shift the factor or product toward the left to ordinally relate it to the fixed decimal point.

After depression of digit keys 1 to enter a multiplicand value into selector carriage 2 with depression of decimal key 3 in proper sequence with the digit keys if the value includes a decimal digit, multiplicand entry key 14 is depressed. As previously described, depression of decimal key 3 couples stop carriage 119 for shifting with carriage 2. However, if there are no decimal digits in the multiplicand, decimal key 3 will not be depressed and the coupling operation is effected upon depression of key 14 also as previously described. A number of other operations are performed in response to depression of key 14 as described in the following.

It will be recalled that stop drum 98 is operable in conjunction with stop arm 103 to arrest selector carriage 2 from left shift movement in position for entry and printing of the multiplicand in ordinally correct position with respect to a decimal point printed in accordance with the setting of selection slide 64 on selection bar 59 (FIG. 5*b*), and that the slide is set in accordance with the setting of the drum. Accordingly, upon depression of multiplicand entry key 14, arm 103 is rocked counterclockwise from its central position (FIGS. 1*a*, 7, 10) into position for movement with carriage 2 in a path to engage drum 98 thereby terminating left shift movement of the carriage.

The means for rocking arm 103 counterclockwise upon depression of key 14 which is spring retracted includes a bail 158 (FIGS. 10, 12) loosely mounted on shaft 149 on which bail 148 is mounted. Bail 158 extends longitudinally of shaft 149 on the opposite side from bail 148 and has a forwardly extending right end which is provided with a rightwardly turned lug 158*a* which lies beneath the rear shoulder of the stem of key 14. Accordingly, when key 14 is depressed, bail 158 will be rocked counterclockwise.

Bail 158, at its left end, is provided with an upstanding ear to which the front end of a rearwardly extending link 159 is pivotally connected. The rear end of link 159 is pivotally connected to the lower end of a vertically disposed lever 160 which is fulcrumed on a stub shaft 161 which is fixed on a bracket inwardly of the machine's left side frame.

A spring 162 is connected between a pin intermediate the ends of link 159 and a pin intermediate the upper part of lever 160. Spring 162 therefore holds lever 160 counterclockwise and holds link 159 clockwise with respect to its connection with the lever normally to engage the end of an upper offset of the link with the pin of the lever.

A link 163 has pivotal connection at one end with the upper end of lever 160, and extends toward the rear where its other end carries a pin 164 which engages a slot 165*s* in a crank 165 loosely mounted on shaft 118 on which stop arm 103 is splined (FIGS. 10, 10A, 12).

Crank 165 comprises a left portion (FIGS. 10A, 12) which includes slot 165*s* and a right portion slotted for reasons with which the invention is not concerned. Between the two portions of crank 165 is an upstanding arm 166 splined on shaft 118 and having a slot at its end which is engaged by a bridge section connecting the two portions of the crank. Consequently when crank 165 is rocked, arm 166 and shaft 118 will be rocked to rock stop arm 103.

The above described parts are operable to adjust stop arm 103 counterclockwise in cooperation with similar parts operable to adjust arm 103 clockwise upon depression of multiplier entry key 15. It is therefore necessary at this time to describe these similar parts.

The means for rocking arm 103 upon depression of key 15 includes a bail 168 loosely mounted on shaft 149 on which bails 148, 158 are mounted. Bail 168 extends longitudinally of shaft 149 inwardly of bail 148 and on the same side of shaft 149, and lies beneath the rear shoulder of the stem of key 15. Accordingly, when key 15 is depressed, bail 168 will be rocked counterclockwise.

Bail 168, at its left end, is provided with an upstanding ear to which the front end of a rearwardly extending link 169 is pivotally connected. The rear end of link 169 is pivotally connected to the upper end of a vertically disposed lever 170 which has common fulcrum on stub shaft 161 with lever 160.

A spring 171 is connected between a pin intermediate the ends of link 169 and a pin intermediate the lower portion of lever 170. Spring 171 therefore holds lever 170 clockwise and holds link 169 counterclockwise with respect to its connection with the lever normally to engage the end of a lower offset of the link with the pin of the lever.

A link 173 has pivotal connection at one end with the lower end of lever 170, and extends toward the rear where its other end is pivotally mounted on pin 164 which is carried by the rear end of link 163 and which engages slot 165*s* of crank 165.

With the parts held in normal position by springs 162 and 171, as above described, links 163 and 173 will hold crank 165 in position to locate stop arm 103 in a central position where it will pass idly between stop drums 97, 98 (FIG. 7) when stop carriage 119 is shifted.

When bail 158 is rocked counterclockwise upon depression of key 14, link 159 will be moved forwardly thereby rocking lever 160 clockwise and moving link 163 toward the rear. Rearward movement of link 163 will rock crank 165 counterclockwise thereby rocking stop arm 103 counterclockwise for movement in a path to engage stop drum 98 upon left shift of stop carriage 119 with selector carriage 2 (FIG. 5*c*). In the above operation, the pivotal connection of link 173 with lever 170 will be held stationary and link 173 will be rocked idly clockwise about this connection.

Depression of any one of the function keys 14–17 (FIG. 2) is operable to engage main clutch 135 (FIG. 8) for the previously noted 30° step of movement. The keys are spring retracted and therefore means is operable to latch the depressed key to maintain stop arm 103 in adjusted position. The clutch engaging and latch means is common to and operates in like manner with respect to all of the function keys. Therefore the following description with reference to key 14 will suffice.

A bail 175 (FIGS. 10, 11) extends transversely of the machine and is engaged at its upper edge by a forwardly extending shoulder of the stem of key 14. Bail 175 is supported at the rear of a pair of horizontally disposed arms which at their front are rockably mounted on a shaft 176 supported in the machine side frames.

A lug 14*a* extends forwardly from the stem of key 14, and the rear edge of a transverse bail 177 is normally located below and forwardly of lug 14A. Bail 177 is secured on a transverse shaft 174 which is fulcrumed in the machine side frames.

The left arm of bail 175 includes an upstanding arm 175*a* whereas a rearwardly extending arm 177*a* is carried by the left end of bail 177. A rearwardly extending link 178 (FIG. 8) is pivotally connected at its front to the end of arm 175*a* of bail 175 and a rearwardly extending link 179 is pivotally connected at its front to arm 177*a* of bail 177. Links 178, 179 have yieldable slot and pin connection; link 179 being normally spring held rearwardly with respect to link 178 to the limit of the slot and pin connection and connected at its rear to the front end of a clutch lever 180 of the aforenoted main clutch 135.

Clutch 135 is of well-known construction wherein the driving member driven by a motor (not shown) is adapated to be engaged by a spring urged pawl 135*p* mounted on the driven member which is secured to the machine main drive shaft 51.

A spring 181 attached to link 178 normally holds links 178, 179 forwardly thereby holding bails 175, 177 counterclockwise (FIGS. 10, 11) and clutch lever 180 counterclockwise (FIG. 8) in engagement with pawl 135*p* to disengage clutch 135.

Depression of key 14 will rock bail 175 clockwise thereby moving links 178, 179 rearwardly and rocking clutch lever 180 clockwise to release clutch pawl 135p to engage clutch 135.

In the above clutch engaging operation, bail 177 will be rocked clockwise by link 179 as key 14 moves downwardly. This will engage the rear edge of bail 177 with the front of lug 14a of the key stem. Thereupon the spring connection between links 178, 179 will yield until lug 14a passes below bail 177 which will then snap clockwise above lug 14a to latch key 14 depressed and the clutch engaging parts in operated position.

Clutch 135 (FIG. 8), after engagement as described above, will be interrupted in its cycle of operation after approximately a 30° step of movement by a clutch lever 182. Lever 182 comprises a rearwardly extending arm having a bent over end normally in the path of clutch pawl 135p. A depending arm of the clutch lever is provided for a purpose later described.

A cam follower comprising a lever 183 has common fulcrum with clutch lever 182. Follower 183 comprises a depending arm having a roller at its end normally engaging the high part of a cam 184 shown in dotted lines (FIG. 8) and which has a low part immediately clockwise from the roller. Spring means holds clutch lever 182 counterclockwise with respect to follower 183 and in engagement with a limit stop comprising a pin on the follower. Accordingly, when follower 183 engages the high part of cam 184, clutch lever 182 will be held counterclockwise in the path of clutch pawl 135p.

When the driven member of engaged clutch 135 rotates 30°, pawl 135p will engage lever 182 and the clutch will be disengaged. In this step of movement, the low part of cam 184 will be brought into registration with the roller of follower 183. Follower 183 will now be free for clockwise movement to rock clutch lever 182 likewise thereby releasing pawl 135p to reengage clutch 135 for completion of its cycle as will be described later.

Clutch 135 in its 30° step of movement in response to depression of key 14 operates means for performing a number of operations. A common drive member driven by the clutch is operable to perform these operations. Depression of key 14 adjusts a selection member into driven relationship with the common drive member and the selection member driven by the drive member operates selected program slides which through appropriate drive means perform the above referred to operations later described.

The common drive member comprises a power slide 185 (FIGS. 10, 12, 14) which is reciprocated once for each cycle of clutch 135. Slide 185 extends transversely of the machine below and to the rear of the keyboard in a vertically disposed position, and is adapted for transverse reciprocation by pin and slot mounting on a transverse partition plate 186.

Means for reciprocating slide 185 upon operation of clutch 135 comprises a bell crank 187 having the end of one arm engaging a slot in the slide and the other arm connected to the front of a rearwardly extending link 188. The rear of link 188 is connected to a depending arm of a cam follower 190 which engages positive action cam means 189 on main drive shaft 51.

Normally power slide 185 is held toward the right by the above described drive means. Early in a cycle of clutch 135, cam follower 190 is rocked counterclockwise (FIG. 10) thereby drawing link 188 rearwardly and rocking bell crank 187 clockwise (FIG. 12) to drive slide 185 toward the left. The parts will dwell until near the end of the clutch cycle and then be restored.

A selection shaft 191 normal to slide 185 extends forwardly below the keyboard, and is slidably and rotatably mounted adjacent its ends in partition plate 186 and a forward partition plate 192. A depending blade 193 is secured to and extends longitudinally of shaft 191, and includes a rear lug 193r. Normally shaft 191 and blade 193 are held forwardly and counterclockwise by a spring 194 with the rear of lug 193r in an opening in plate 186 and immediately to the front of a tooth space of a series of teeth 185t at the lower edge of an opening in slide 185.

Blade 193 has a rightwardly turned lug 193t at its upper edge intermediate its ends (FIG. 10). An interponent 195 pivotally mounted on a transverse shaft 196 engages the front of lug 193t and is immediately below the end of the stem of key 14. Depression of key 14 therefore will rock interponent 195 counterclockwise and adjust blade 193 rearwardly to engage lug 193r with a tooth space of teeth 185t. Accordingly, when plate 185 is reciprocated, blade 193 will be rocked clockwise and restored.

Blade 193 is provided with three depending lugs which respectively operate program slides 197, 198, 199. These slides extend transversely of the machine, are slidably mounted adjacent their ends in suitable bracket means, and are spring held in a normal position toward the right. Slides 197, 198, 199 are each provided with an upstanding lug, which when blade 193 is adjusted into driven relationship with power slide 185, are in the clockwise path of the depending lugs respectively of said blade. Therefore, when blade 193 is rocked clockwise, slides 197, 198, 199 will be moved toward the left and spring restored when blade 193 is restored counterclockwise.

Movement of slide 197 will operate means to release selector carriage 2 (FIGS. 5c, 7) from escapement lever 87 so that said selector carriage and stop carriage 119 will be left shifted until arrested by engagement of stop arm 103 with stop drum 98. The releasing means includes a bell crank 200 (FIGS. 6, 9, 12) mounted adjacent the right end of slide 197 on the right side frame. A rearwardly extending arm of bell crank 200 is located to the left of an upstanding lug 197r at the right end of slide 197, and a rightwardly extending arm of the crank has pivotal connection to the front of a rearwardly extending link 201 which has slot and pin connection with an arm 202 extending farther to the rear.

Spring means normally holds arm 202 extended with respect to link 201 to the limit of the slot and pin connection. Furthermore a spring 205 normally holds link 201 and arm 202 forwardly, and urges the end of arm 202 upwardly. The end of arm 202 is operable to engage the rightwardly extending end of escapement lever 87 or alternatively a shoulder 202s of the arm is operable to engage the rightwardly extending arm of a bell crank 203 mounted on the right side frame and having a rearwardly extending arm engaging gear 117 (FIGS. 5b, 9) which is fast on shaft 100 on which stop drum 97 is fast.

The left end of the shaft 100 (FIGS. 5b, 8) is engaged by a rearwardly extending arm of a bell crank 204 which is mounted on the left side frame and which has a leftwardly extending arm engaging the rear of an upstanding arm 183a of the aforedescribed cam follower 183. Cam follower 183 is normally held counterclockwise by the high part of cam 184. Therefore bell crank 204 will be held clockwise (FIG. 5b) to hold longitudinally shiftable shaft 100 toward the right and bell crank 203 clockwise. Shafts 100, 101, 102 (FIGS. 5b, 5c) on which stop drums 97, 98, 99 respectively are fast, are coupled for simultaneous longitudinal movement by a yoke 206. Therefore shafts 101, 102 will be held toward the right with shaft 100.

The decimal system is not intended for use unless both decimal dials 6, 7 are adjusted from 0 position and are adjusted to set stop drum 99 to provide for at least three decimal digits in the product. To this end a cam 207 (FIGS. 5c, 6, 9) is fast on the right end of shaft 102. A cam follower in the form of a crank 208 has an upstanding arm at the end of which is mounted a roller engaging cam 207. A forwardly extending arm of follower 208 has link connection 209 with arm 202. When stop drum 99 is set for less than three decimal digits, follower 208 will engage the low part of cam 207, and therefore spring 205 will hold the end of arm 202 raised above the right end of escapement lever 87. However, when drum 99 is set for three or more decimal digits, follower 208 will engage the high part of cam 207 and the end of arm 202 will be lowered to a position immediately in front of the end of lever 87 with shoulder 202 below crank 203.

With arm 202 in the above-described lowered position, the leftward movement of slide 197 will cause lug 197*r* to rock bell crank 200 counterclockwise thereby moving arm 202 rearwardly to engage and rock escapement lever 87 counterclockwise thereby releasing carriage 2 for left shift movement. Carriage 2 and coupled stop carriage 119 will be shifted to the left until arrested by engagement of stop arm 103 with stop drum 98. As an incident to the arresting operation, coupled shafts 100, 101, 102 will be shifted a slight distance to the left and this movement will reengage clutch 135 to complete its cycle as follows.

Clutch 135 (FIG. 8) in its 30° step of movement will rotate cam 184 to bring its low part into registration with cam follower 183. This will permit the above-noted left shift of shaft 100 (FIG. 5*b*) which movement will rock bell crank 204 counterclockwise, and follower 183 and clutch lever 182 clockwise (FIG. 8) to release clutch pawl 135*p* thereby reengaging clutch 135 to complete its cycle. If the decimal system is disabled, arm 202 will be raised, and in its rear movement will pass idly above lever 87. Shoulder 202*s*, however, will engage and rock crank 203 counterclockwise thereby shifting shafts 100, 101, 102 to effect the clutch reengaging operation. Operation of clutch 135 in completing its cycle will be described after description of the operations effected in its preliminary 30° step of operation by program slides 198, 199.

Movement of slide 198 toward the left (FIG. 12) will operate means to adjust and hold bail 148 toward the right on shaft 149 against the tension of spring 150. This will bring a vertical slot 148*s* in the upper edge of bail 148 in registration with the stem of key 14. This will permit bail 148 to be restored to uncouple selector carriage 2 and stop carriage 119 upon release of latch 156 (FIG. 8) while key 14 is latched depressed. Latch 156 is released just prior to restoring operation for carriage 2 as later described whereas key 14 is not unlatched until near the end of the clutch cycle. When the carriages are uncoupled, stop carriage 119 will be restored independently by spring 133 (FIG. 5*c*).

The means for adjusting bail 148 comprises a vertically disposed lever 210 (FIGS. 10, 12) having its upper end engaging the left end of bail 148 and its lower end engaging the left side of an upstanding lug of slide 198. Accordingly, as slide 198 is moved toward the left, lever 210 will be rocked clockwise as viewed from the front of the machine to adjust bail 148 rightwardly.

Movement of slide 199 toward the left is operable to enable means for adjusting shaft 68 and arms 67 (FIGS 5*b*, 10, 11 fixed thereon from their normal leftmost position to their rightmost position as shown in dot-dash lines wherein arms 67 are operatively associated with selection bar 59 which must be operated to print the decimal point in accordance with the setting of dial 7 and stop drum 98.

The means enabled upon movement of slide 199 includes an auxiliary clutch 212 (FIGS. 11, 12, 13). The driving member of clutch 212 is fast on main drive shaft 51 driven by main clutch 135. The driven member of clutch 212 carries a spring urged pawl 212*p* having a tooth adapted to engage a recess in the driving member to engage the clutch. A forwardly extending clutch lever 213 is spring urged counterclockwise and has its rear end normally engaging pawl 212*p* to disengage the clutch. The front end of lever 213 engages the left side of an upstanding lug of slide 199, therefore when slide 199 is moved to the left, lever 213 will be rocked clockwise to disengage pawl 212*p* to engage clutch 212.

A cam 214 is driven by clutch 212, and a cam follower 215 is spring urged counterclockwise normally to engage the low part of the cam. An operating arm 215*a* extends rearwardly from follower 215 and overlies a cam edge 216*a* of a yoke 216 which is slidably and pivotally mounted on a shaft 217 extending transversely below selection bars 58, 59, 60. A spring 216*s* normally holds yoke 216 toward the right (FIG. 5*b*) and counterclockwise (FIG. 10) to locate cam edge 216*a* in the path of arm 215*a*. A bracket 218 is fast on shaft 68 intermediate its ends and a tongue 216*b* of yoke 216 extends forwardly between a pair of legs of bracket 218.

Auxiliary clutch 212 will operate with reengaged main clutch 135 as said main clutch completes its cycle. This operation comprising approximately 330° of the main clutch cycle will effect the multiplicand printing and entering operations.

Early in the operation of clutch 212, the high part of cam 214 will rock follower 215 clockwise thereby engaging arm 215*a* with cam edge 216*a* to cam yoke 216 toward the right. Yoke 216, through tongue 216*b* and bracket 218, will shift shaft 68 and arms 67 to their rightmost adjusted position as shown in dot-dash lines (FIG. 5*b*). Therefore in the ensuing multiplicand printing operation, bar 59 will be operated to print the decimal point in accordance with the setting of dial 7 and stop drum 98.

After the printing operation, selector carriage 2 is restored as previously described. As an incident to the restoring operation, bail 148 is released from latch 156 (FIG. 8) to uncouple stop carriage 119 which will be restored independently by spring 122 (FIG. 5*c*). Key 14 will be latch depressed at this time. Regardless, however bail 148, as previously described, is held to the right to register slot 148*s* with the stem of key 14 and may therefore be restored with the key depressed.

The means for releasing latch 156 includes arm 139 which is rocked counterclockwise by cable 94 prior to the carriage restoring movement of carriage 2 by cable 94. The counterclockwise movement of arm 139 will engage a pin 139*p* at its upper end with the lower edge of a rearwardly extending arm of latch 156 to rock said latch clockwise from engagement with ear 148*e* of bail 148. Spring 150 (FIG. 12) therefore will restore the bail and spring 154 (FIG. 10) will restore arm 153 and finger 145 clockwise to uncouple stop carriage 119.

Near the end of the cycle of main clutch 135, cam follower 190 will be restored clockwise thereby restoring power slide 185 and program slides 197, 198, 199 (FIG. 12). As a result, escapement arm 87 (FIG. 5*c*) will be restored to hold carriage 2 in its home position, lever 210 will be released to permit bail 148 to be restored to the left and clutch lever 213 will be restored to position to disengage auxiliary clutch 212. However, at this time, bail 148 which has been restored clockwise will not be restored toward the left because the stem of latched down key 14 will engage slot 148*s* of the bail. Furthermore, clutch 212 will not complete its cycle with the cycle of clutch 135 because of its engagement after clutch 135. Clutch 212 however will be disengaged during the first part of the next cycle of clutch 135.

Clutch lever 180 (FIG. 8) is controlled to disengage clutch 135 at the end of the cycle and to unlatch key 14. Means for performing these operations includes a cam follower 220 spring urged clockwise normally to engage the low part of a cam 221 fast on main drive shaft 51. Follower 220 includes a forwardly extending arm on which a lever 222 is fulcrumed and which is spring urged counterclockwise to engage an upper end with an extension of clutch lever 180 forwardly of a shoulder 180*s*.

Near the end of the clutch cycle, the high part of cam 221 will engage and rock follower 220 counterclockwise. This will engage lever 222 with shoulder 180*s* thereby rocking clutch lever 180 counterclockwise into the path of pawl 135*p* to disengage clutch 135 at the end of the cycle. This operation of lever 180 will move link 179 forwardly thereby rocking bail 177 counterclockwise (FIGS. 10, 11) to release key 14. Key 14 will be retracted and this will permit bail 148 (FIG. 12) to be restored to the left, bail 158 to be restored clockwise (FIG. 10), and stop arm 103 restored to central position.

During the forward movement of link 179, the connection with link 178 will yield until key 14 is released. Then spring 181 will restore link 178 and bail 175.

In the above described cycle of clutch 135, rear racks 23 (FIGS. 1*b*, 5*a*) will be controlled with respect to setting gears 28 to enter the multiplicand into the ordinally corresponding digital actuators 26 mounted in carriage 27 which, as previously noted, is normally in a right shifted position with the lowest order setting gear 28 in the plane of the lowest order rack 23. However, it is old in the art to control registering mechanism in a ten key machine to enter a value into a given register, storage means or into settable actuators in accordance with a value in a selector carriage upon operation of the machine in response to depression of a given function key. The invention therefore is not concerned with the means for controlling this operation but only with the control of the ordinal relation of the selector carriage with respect to the racks.

The following examples will illustrate the principle of operation with decimal dial 7 (FIGS. 2, 5*c*) set to provide for three decimal digits in the multiplicands. It will be recalled that the right end of stop drum 98 is one ordinal position from arm 103 in home position and acts as a stop surface. Therefore, when dial 7 is set to the 3 decimal digit position, the second step 98*s* from the right end of drum 98 will be in the path of stop arm 103 to provide for entry of three decimal digits into carriage 2, i.e., second step 98*s* will be three ordinal carriage shift positions from arm 103. Furthermore, slide 64 (FIG. 5*b*) will be adjusted to the third position from its right end position to provide for the printing of three decimal digits.

The first example will be the entry of the multiplicand value .625 which includes the maximum number of decimal digits provided for by the setting of dial 7. Decimal key 3 will be depressed first and accordingly stop carriage 119 with stop arm 103 will be coupled to carriage 2 in right home position. Next, the 6, 2, and 5 digit keys 1 will be depressed to enter these values into carriage 2. This will shift carriage 2 and stop arm 103 three ordinal positions to the left thereby bringing arm 103 a slight distance from the plane of the active step 98*s*. Next, upon depression of multiplicand entry key 14, arm 103 will be adjusted counterclockwise into the path for engagement with step 98*s*, and clutch 135 will be engaged for its step of rotation which operation will release carriage 2 from the escapement for left shift movement. Arm 103, however, will immediately engage step 98*s* and carriage 2 will be arrested after the small previously described leftward movement of drum 98. This small movement of carriage 2 with drum 98 which operates to reengage clutch 135 to complete its cycle is not sufficient to shift the carriage from its effective third ordinally shifted position. Therefore, the value 625 will be entered into the three lowest order rotary digital actuators 26 and the value 0.625 will be printed. It will be recalled that the decimal type member is operated in conjunction with the next higher order type wheel; hence the 0 to the left of the decimal point.

The second example will be the entry of the multiplicand value 86.4 which includes two decimal digits less than the number provided for by the setting of dial 7. After depression of the 8 and 6 digit keys 1 and depression of decimal key 3, coupled stop arm 103 will be shifted one ordinal position with carriage 2 upon entry of the digit 4. Arm 103 therefore will be two ordinal positions from the active step 98*s*, and upon depression of multiplicand entry key 14, carriage 2 will be shifted two ordinal positions before it is arrested. The value 86400 therefore will be entered into carriage 2, and when the machine is cycled, this value will be entered into the five lowest order actuators 26 and the value 86,400 will be printed.

The third example will be the entry of the multiplicand value 469 which is a whole number without decimal digits. After entry of the digits into carriage 2, multiplicand entry key is depressed. This operates to couple arm 103 as described in lieu of coupling by decimal key 3. Carriage 2 therefore will be shifted three ordinal positions after entry of the digits. Therefore the value 469000 is entered into carriage 2 and when the machine is cycled this value will be entered into the six lowest order actuators 26 and the value 469.000 will be printed. The three multiplicands of the above examples are printed ordinally with respect to one another as follows:

```
    0.6 2 5
  8 6.4 0 0
4 6 9.0 0 0
```

Obviously, the multiplicands are not entered and printed successively as shown above which showing is intended only to illustrate the principle of operation whereby a plurality of multiplicands are printed with respect to a fixed decimal point.

*Multiplication (multiplier entry and printing)*

After entry and printing of a multiplicand, digit keys 1 (FIG. 2) are depressed to enter a multiplier value into selector carriage 2 with depression of decimal key 3 in proper sequence with the digit keys if the value includes decimal digits, and then multiplier entry key 15 is depressed. As previously described, depression of decimal key 3 couples stop carriage 119 (FIGS. 1*a*, 5*c*, 7) for shifting with carriage 2. However, if there are no decimal digits in the multiplier, decimal key 3 will not be depressed and the coupling operation is effected upon depression of key 15 also as previously described. A number of other operations are performed in response to depression of key 15 as described in the following.

It will be recalled that stop drum 97 (FIG. 5*b*) is operable in conjunction with stop arm 103 to arrest selector carriage 2 from left shift movement in position for entry and printing of the multiplier in ordinally correct position with respect to a decimal point printed in accordance with the setting of selection slide 65 on selection bar 60, and that the slide is set in accordance with the setting of the drum. Accordingly, upon depression of multiplier entry key 15, arm 103 is rocked clockwise from its central position into position for movement with carriage 2 in a path to engage drum 97 thereby terminating left shift movement of the carriage.

The means for rocking arm 103 clockwise upon depression of key 15 has been described in connection with the means for rocking arm 103 counterclockwise upon depression of multiplicand entry key 14 and operates as follows.

Bail 168 (FIGS. 10, 12) is rocked counterclockwise upon depression of key 15 and link 169 will be moved forwardly thereby rocking lever 170 counterclockwise and moving link 173 toward the rear. Rearward movement of link 173 will rock crank 165 clockwise thereby rocking stop arm 103 clockwise for movement in a path to engage stop arm 97 upon left shift of stop carriage 119 with selector carriage 2. In the above operation, the pivotal connection of link 163 with lever 160 will be held stationary and link 163 will be rocked idly counterclockwise about this connection.

The stem of key 15 is constructed and operates with respect to bails 175, 177 (FIGS. 10, 11) substantially as described in connection with key 14. Therefore clutch 135 will be engaged for a 30° step of operation upon depression of key 15 and the key will be latched depressed.

Power slide 185 (FIGS. 13, 14), as previously described, is moved to the left during the 30° operation of clutch 135 and is restored near the end of the clutch cycle. A program shaft 224 extending front and rear has its ends rotatably mounted in partition plates 186, 192 with its rear end adjacent the left end of slide 185. Normally disabled means is operable to step shaft 224 a 45° turn counterclockwise during the leftward movement of slide 185 and another 45° turn when the slide is restored.

The means for stepping shaft 224 comprises a pair of ratchet wheels 225, 226 fast on shaft 224 to the rear of plate 186. Each wheel has four teeth and the wheels are displaced 45° on the shaft from each other. A feed pawl 227 is pivotally mounted on the rear of slide 185 in the plane of wheel 225 and has its left operating end normally above said wheel immediately to the right of a tooth. A feed pawl 228 is pivotally mounted on the rear of slide 185 and is spring biased clockwise to engage its left operating end with wheel 226 immediately to the left of a tooth. Normally when slide 185 is reciprocated, pawl 227 will move idly above wheel 225 and pawl 228 will slide idly on the side of a tooth of wheel 226. Depression of key 15, however, will enable pawls 227, 228 as follows.

A rightwardly extending arm of pawl 227 has a horizontal slot *227s*. The rear end of a slide 230 (FIGS. 10, 14) engages slot *227s* and is supported adjacent its front end by a transverse bracket. A cam slot *230s* is located intermediate the ends of slide 230 and is engaged by a fixed transverse rod 231. Normally a spring 229 holds slide 230 forwardly with its rear urged upwardly and the rear of cam slot *230s* engaging rod 231 to hold the rear of said slide lowered and the left operating end of pawl 227 raised.

When key 15 rocks bail 168 (FIGS. 10, 12), a pin *168p* at the end of a depending arm at the right end of the bail will engage an upper projection of slide 230 and move said slide rearwardly. As slide 230 is moved rearwardly, cam slot *230s* will permit spring 229 to raise the rear of the slide thereby rocking pawl 227 counterclockwise (FIG. 14) to lower its left end to a position immediately to the right of a tooth of wheel 225. Therefore, upon leftward movement of slide 185, pawl 227 will engage a tooth of wheel 225 and rotate shaft 224 45° counterclockwise; and at the same time, pawl 228 will be moved to the left and rocked clockwise to position its operating end immediately to the left of a tooth of wheel 226. As a result, when slide 185 is restored, pawl 228 will engage a tooth of wheel 226 and step shaft 224 another 45° counterclockwise.

During the first 45° step of shaft 224, cam means fast on the shaft is operable to move the previously described program slides 197, 198, toward the left, and additionally program slides 232, 233 which also are normally spring held toward the right. The cam means comprises cams 235, 236, 237, 238 operatively associated respectively with the slides. Normally the right edge of an upstanding lug of each slide engages a low part of the associated cam. However, during the first 45° step of shaft 224, a lobe of each cam 235, 236, 237, 238 is operable to move and hold the associated slides 197, 198, 232, 233 toward the left.

The leftward movement of slide 197 will release carriage 2 and coupled stop carriage 119 for left shift as previously described, and the carriages will be shifted until arrested by engagement of stop arm 103 with stop drum 97 (FIGS. *5b*, *5c*). Furthermore, as previously described, arrest of the carriages will cause reengagement of clutch 135 (FIG. 8) to effect the multiplier printing and entering operations.

The operation stemming from leftward movement of slide 198 has been described which operation provides for uncoupling of carriages 2, 119 for the carriage restoring operation.

In the multiplier printing operation, means is operable to adjust shaft 68 and drive arms 67 rightward (FIGS. *5b*, 13) to their intermediate position for operation of selection bar 60 for printing the decimal point in accordance with the setting of dial 6 and stop drum 97. The leftward movement of slide 232 controls this operation as follows.

A depending lug of slide 232 engages the right edge of a front arm of a bell crank 239. A right arm of the bell crank has connection with the front end of a rearwardly extending slide 240 which, adjacent its rear, carries an upstanding lug *240a*. Lug *240a* is positioned immediately to the rear of a depending part of a bail 241 (FIGS. 10, 13) fulcrumed on shaft 217 on which yoke 216 is mounted. Bail 241 has a front edge engaging an open end slot at the rear of an arm 242 which is fast on a transverse shaft 243 fulcrumed in the machine framing, and the rear end of the arm is normally located below the inner face of a depending cam extension *218a* of bracket 218 which, as described, is fast on shaft 68.

Bell crank 239 will be rocked clockwise by slide 232 in its leftward movement, and slide 240 will be moved forwardly to engage lug *240a* with bail 241 thereby rocking the bail clockwise and arm 242 counterclockwise. Arm 242 in its counterclockwise movement will engage cam extension *218a* thereby moving shaft 68 and drive arms 67 to their intermediate position. Therefore in the multiplier printing operation, bar 60 will be operated so that a decimal point will be printed in accordance with the setting of dial 6 and stop drum 97.

Clutch 135 (FIG. 8) is not disengaged when it completes its cycle in the multiplier printing and entering operation, but continues 30° in the next cycle where it is arrested by clutch lever 182. This next cycle is for a total taking operation to print the product as later described. Movement of slide 233 toward the left (FIG. 13) controls this operation to prevent disengagement of clutch 135 by clutch lever 180 which, as previously described, is normally operable to disengage the clutch in full cycle position.

Slide 233 has, at its left end, a rearwardly projecting lug which, when the slide is moved to the left, is located above a cam edge at the front of the lower end of lever 222. Lever 222, therefore will be rocked clockwise by slide 233 when follower 220 is rocked counterclockwise near the end of the clutch cycle. As a result, lever 222 will not engage shoulder *180s* to move clutch lever 180 to clutch disengaging position, and the clutch will continue 30° into the next cycle where it will be arrested by clutch lever 182.

Near the end of the multiplier printing and entering cycle, power slide 185 will be restored and program shaft 224 will be stepped another 45°. This will remove the lobes of cam 235, 236 from engagement with the lugs of slides 197, 198 which slides will be restored. The lobes of cams 237, 238 will remain engaged with the lugs of slides 232, 233 thereby holding these slides to the left.

In the 30° step of clutch 135 for the product printing cycle program shaft 224 will again be stepped 45° and the lobes of cams 237, 238 will be removed from engagement with the lugs of slides 232, 233 and these slides will be restored.

In the above described multiplier printing and entering cycle of clutch 135, rear racks 23 (FIGS. *1b*, *5a*) will be controlled to enter the multiplier into the ordinally corresponding multiplier storage gears 30 which are ordinally fixed with respect to said racks. However, it is old in the art to control registering mechanism in a ten key machine to enter a value into a given register or storage means in accordance with a value in a selector carriage upon operation of the machine in response to depression of a given function key. The invention therefore is not concerned with the means for controlling this operation but only with the control of the ordinal relation of the selector carriage with respect to the racks.

The following examples will illustrate the principle of operation with decimal dial 6 (FIGS. 2, *5c*) set to provide for two decimal digits in the multipliers. It will be recalled that the right end of stop drum 97 (FIG. *5b*) is one ordinal position from arm 103 in home position and acts as a stop surface. Therefore when dial 6 is set to the 2 decimal digit position, the first step *97s* from the right end of drum 97 will be in the path of stop arm 103 to provide for entry of two decimal digits into carriage 2, i.e., first step 97s will be two ordinal carriage shift positions from arm 103. Furthermore, slide 65 will be adjusted to the second position from its right end position to provide for the printing of two decimal digits.

The first example will be the entry of the multiplier value .57 which includes the maximum number of decimal digits provided for by the setting of dial 6. Decimal key 3 will be depressed first, and accordingly stop carriage 119 with stop arm 103 will be coupled to carriage 2 in right home position. Next, the 5 and 7 digit keys 1 will be depressed to enter these values into carriage 2. This will shift carriage 2 and stop arm 103 two ordinal positions to the left thereby bringing arm 103 a slight distance from the plane of the active step 97s. Next, upon depression of multiplier entry key 15, arm 103 will be adjusted clockwise into the path for engagement with step 97s, and clutch 135 will be engaged for its step of rotation which operation will release carriage 2 from the escapement for left shift movement. Arm 103, however, will immediately engage step 97s and carriage 2 will be arrested after the previously described small leftward movement of drum 97. This small movement of carriage 2 with drum 97 which operates to reengage clutch 135 to complete its cycle, is not sufficient to shift the carriage from its effective second ordinally shifted position. Therefore the value 57 will be entered into the two lowest order multiplier storage gears 30 and the value 0.57 will be printed.

The second example will be the entry of the multiplier value 2.8 which includes one decimal digit less than the number provided for by the setting of dial 6. After depression of the 2 digit key 1 and depression of decimal key 3, coupled stop arm 103 will be shifted one ordinal position with carriage 2 upon entry of the digit 8. Arm 103 therefore will be one ordinal position from the active step 97s, and upon depression of multiplier entry key 15, carriage 2 will be shifted one ordinal position before it is arrested. The value 280 therefore will be entered into carriage 2, and when the machine is cycled, this value will be entered into the three lowest order multiplier storage gears 30 and the value 2.80 will be printed.

The third example will be the entry of the multiplier value 25 which is a whole number without decimal digits. After entry of the digits into carriage 2, multiplier entry key 15 is depressed. This operates to couple arm 103 as described in lieu of coupling by decimal key 3. Carriage 2 therefore will be shifted two ordinal positions after entry of the digits. Therefore the value 2500 is entered into carriage 2 and when the machine is cycled this value will be entered into the four lowest order multiplier storage gears 30 and the value 25.00 will be printed.

The three multipliers of the above examples are printed ordinally with respect to one another as follows:

```
   .5 7
  2.8 0
2 5.0 0
```

Obviously, the multipliers are not entered and printed successively as shown above which showing is intended only to illustrate the principle of operation whereby a plurality of multipliers are printed with respect to a fixed decimal point.

*Multiplication (product registration and printing)*

A program of multiplication is initiated subsequent to entry of a multiplier and the step of clutch 135 of the product printing cycle. Carriage 27 (FIG. 5a) will be in normal rightmost shifted position wherein rotary actuators 26 in which the multiplicand is entered are in position for registering in the corresponding order register wheels 25 (FIG. 1b) and wherein intermediate counting gear 32 engages the lowest order intermediate multiplier storage gear 33. The multiplier digits are counted out from lower to higher orders; carriage 27 being ordinally shifted to the left to engage counting gear 32 with the successive higher order storage gears 33 and to shift actuators 26 for registration in the successive higher order register wheels 25.

Control of product registration including shifting of the carriage and counting out the successive order multiplier digits is old and well known and concerns the present invention only in the provision to effect product registration in such orders of the register that, in a total taking operation, the product will be printed in correct ordinal relation with a fixed decimal.

Clutch lever 182 (FIG. 8) will be rocked clockwise to reengage clutch 135 for the total taking operation to print the product. In this operation, comprising the major part of the clutch cycle, racks 23 will be controlled to zeroize register wheels 25 in which the product is registered. Furthermore, in the printing operation, shaft 68 and arms 67 will be in their left normal position. Therefore selection bar 58 (FIG. 5b) will be operated to print the decimal point in a position corresponding to the sum of the settings of dials 6, 7.

At the end of the total cycle, the clutch will be disengaged and key 15 released all as described in connection with key 14. Furthermore, near the end of the cycle, program shaft 224 (FIGS. 13, 14) will again be stepped and the cams thereon will be brought into position for the next multiplication entering operation.

Clutch lever 182 may be rocked to reengage clutch 135 automatically at the end of product registration or by obvious mechanical connections upon depression of a total key (not shown).

The following examples will illustrate the ordinal control of product registration in accordance with the principles of operation of the devices of the invention with decimal dial 7 (FIGS. 2, 5c) set to provide for three decimal digits in the multiplicands and decimal dial 6 set to provide for two decimal digits in the multipliers. These settings of the decimal dials will provide for five decimal digits in the products, and therefore selection slide 63 (FIG. 5b) for the decimal printing for products will be set to its fifth position from its rightmost setting.

In the first example, the multiplicand will be .224 and the multiplier will be .12 and these factors will be printed as follows.

```
0. 2 2 4   (multiplicand)
  0. 1 2   (multiplier)
```

Product registration will be inititated with carriage 27 (FIG. 5a) in right home position wherein counting gear 32 engages the lowest order storage gear 33 in which the lowest order significant multiplier digit is stored. The lowest order significant multiplicand digit is stored in the lowest order actuator 26 and therefore the product will be registered ordinally in register wheels 25 and printed ordinally with respect to the factors as follows.

```
    0. 2 2 4   (multiplicand)
      0. 1 2   (multiplier)
0. 0 2 6 8 8   (product)
```

In the second example, the multiplicand will be 2.4 and the multiplier will be 1.2 and these factors will be printed as follows.

```
2. 4 0 0   (multiplicand)
  1. 2 0   (multiplier)
```

Carriage 27 is shifted one order to the left from home position to engage counting gear 32 with storage gear 33 in which the lowest order significant multiplier digit is stored and thereby initiate product registration. The lowest order significant multiplicand digit is stored in the third lowest order actuator 26 and therefore the lowest order product digit will be registered in the fourth lowest order register wheel 25. The product therefore will be registered ordinally in register wheels 25 and printed ordinally with respect to the factors as follows.

```
 2.4 0 0   (multiplicand)
   1.2 0   (multiplier)
2.8 8 0 0 0 (product)
```

The third example will include factors without decimal digits; a multiplicand 12 and a multiplier 6 and these factors will be printed as follows.

```
1 2.0 0 0  (multiplicand)
   6.0 0   (multiplier)
```

Carriage 27 is shifted two orders to the left from home position to engage counting gear 32 with storage gear 33 in which the lowest order significant multiplier digit is stored and thereby initiate product registration. The lowest order significant multiplicand digit is stored in the fourth lowest order actuator 26 and therefore the lowest order product digit will be registered in the sixth lowest order register wheel 25. The product therefore will be registered ordinally in register wheels 25 and printed ordinally with respect to the factors as follows.

```
  1 2.0 0 0    (multiplicand)
     6.0 0     (multiplier)
7 2.0 0 0 0 0  (product)
```

From the above examples, it will be observed that all multiplicands are printed around one fixed decimal point, all multipliers around another fixed decimal point, and the products around a fixed decimal point determined by the sum of the decimal digits provided for by the decimal points of the factors.

*Division (dividend entry and printing)*

To set the decimal system for a series of division operations, the operator will determine the maximum number of decimal digits in any dividend and the maximum number in any divisor. Decimal dial 7 (FIGS. 2, 5*c*) for divisors will be set accordingly and decimal dial 6 for quotients will be set to the difference between the number of decimal digits in the dividends and divisors. This will set dividend stop drum 99 to the sum of the settings of drums 97, 98 (FIGS. 5*b*, 5*c*). It will be seen that when a dividend, divisor or quotient has fewer decimal digits that provided for by the settings, zeros are automatically added at the right to shift the value toward the left to ordinally relate it to the fixed decimal point.

After depression of digit keys 1 to enter a dividend value into selector carriage 2 with depression of decimal key 3 in proper decimal sequence with the digit keys if the value includes decimal digits, dividend entry key 16 is depressed. As previously described, depression of the decimal key couples stop carriage 119 for shifting with carriage 2. However, if there are no decimal digits in the dividend, decimal key 3 will not be depressed and the coupling operation is effected upon depression of key 16 also as previously described. A number of other operations are performed in response to depression of key 16 as described in the following.

It will be recalled that stop drum 99 is operable in conjunction with stop arm 104 to arrest selector carriage 2 from left shift movement in position for entry and printing of the dividend in ordinally correct position with respect to a decimal point printed in accordance with the setting of selection slide 63 on selection bar 58 and that the slide is set in accordance with the setting of the drum. Nonadjustable arm 104 is shifted in a path to engage drum 99 and adjustable stop arm 103 is normally shifted in a path between drums 97, 98. Therefore no adjustment of arms 103, 104 is made upon depression of key 16.

Depression of key 16 is operable to engage main clutch 135 for the previously described 30° step of movement and the key is latched depressed. This operation has been described with reference to mechanism common to all of the function keys 14–17.

Depression of key 16 is operable to adjust a selection shaft 245 (FIG. 14) mounted parallel and in similar manner to selection shaft 191 described in connection with the operation of multiplicand entry key 14. Selection shaft 245 is provided with a blade 246 similar to blade 193 of shaft 191 and is normally spring held forwardly and counterclockwise in like manner.

Upon depression of key 16, shaft 245 will be adjusted rearwardly into coupled relationship with power slide 185 and into operating relationship with the previously described program slides 197, 198 (FIGS. 10, 12, 13). These operations are effected by means operating substantially in accordance with means previously described for performing these operations upon depression of key 14. Therefore during the 30° operation of main clutch 135 (FIG. 8), slides 197, 198 will be moved to the left and restored near the end of the clutch cycle.

Slide 197, in its leftward movement, will operate means to release selector carriage 2 from escapement lever 87 so that said selector carriage and stop carriage 119 will be left shifted until arrested by engagement of stop arm 104 with stop drum 99. The operation of the releasing means upon movement of slide 197 has been previously described.

As an incident to the arrest of carriages 2, 119 in left shift movement, coupled shafts 100, 101, 102 on which drums 97, 98, 99 are fast will be shifted slightly to the left to reengage clutch 135 to complete its cycle as previously described.

Movement of slide 198 will operate previously described means to permit uncoupling of selector carriage 2 and stop carriage 119 upon release of latch 156 while key 16 is held depressed in the same manner as described for key 14.

Shaft 68 and drive arms 67 will remain in their normal leftmost position wherein decimal selection bar 58 will be operated to print the decimal point in accordance with the setting of drum 99. Thus the printing mechanism will be operated as previously described to print the dividend in correct ordinal relation with the fixed decimal point. Furthermore, rear racks 23 will be controlled with respect to wheel gears 25*a* (FIG. 1*b*) to enter the dividend into the ordinally corresponding register wheels 25. However, it is old in the art to control registering mechanism in a ten key machine to enter a value into a given register in accordance with a value in a selector carriage upon operation of the machine in response to depression of a given function key. The invention therefore is not concerned with the means for controlling this operation but only with the control of the ordinal relation of the selector carriage with respect to the racks.

It will be noted that the control of the ordinal position of carriage 2 by stop drum 99 in conjunction with stop arm 104 is, in principle, identical with the control exercised by stop drum 97 or 98 in conjunction with stop arm 103. It is not believed necessary, therefore, to present examples to illustrate the dividend entering operation.

*Division (divisor entry and printing)*

After entry and printing of a dividend, digit keys 1 (FIGS. 2, 5*a*, 5*b*, 5*c*) are depressed to enter a divisor into selector carriage 2 with depression of decimal key 3 in proper sequence with the digit keys if the value includes a decimal digit, and then divisor entry key 17 is depressed. As previously described, depression of decimal key 3 couples stop carriage 119 for shifting with carriage 2. However, if there are no decimal digits in the divisor, decimal key 3 will not be depressed and the coupling operation is effected upon depression of key 17 also as previously described. A number of other operations are performed in response to depression of key 17 as described in the following.

It will be recalled that stop drum 98 is operable in conjunction with stop arm 103 to arrest selector carriage 2 from left shift movement in position for entry and printing of the divisor in ordinally correct position with respect to a decimal point printed in accordance with the setting of selection slide 64 on selection bar 59, and that the slide is set in accordance with the setting of the drum. Accordingly, upon depression of divisor entry key 17, arm 103 is rocked counterclockwise (FIGS 7, 10) from its central position into position for movement with carriage 2 in a path to engage drum 98 thereby terminating left shift movement of the carriage.

The means for rocking arm 103 counterclockwise upon depression of key 17 includes a bail 244 (FIGS. 10, 12) mounted on shaft 149 and having a front edge engaged by a rear shoulder of the stem of the key. A rear extension 244*r* of bail 244 underlies bail 158. Therefore depression of key 17 will rock bails 244, 158 counterclockwise. Accordingly, arm 103 will be rocked counterclockwise as described when bail 158 is rocked by depression of key 14.

The stem of key 17 is constructed and operates with respect to bails 175, 177 (FIGS. 10, 11) substantially as described in connection with keys 14–16. Therefore clutch 135 (FIG. 8) will be engaged for a 30° step of operation upon depression of key 17 and the key will be latched depressed.

Power slide 185 (FIGS. 13, 14) as previously described, is moved to the left during the 30° step of clutch 135 and is restored near the end of the clutch cycle. A program shaft 247, parallel with the previously described program shaft 224, has its ends rotatably mounted in partition plates 186, 192. Normally disabled means is operable to step shaft 247 a 60° turn counterclockwise during the leftward movement of slide 185 and another 60° turn when the slide is restored.

The means for stepping shaft 247 comprises a three tooth ratchet wheel 248 fast on shaft 247 to the rear of plate 186. A feed pawl 249 is pivotally mounted on the rear of slide 185 and has its right operating end normally above said wheel immediately to the right of a tooth. A feed pawl 250 is pivotally mounted on the rear of slide 185 and is spring biased counterclockwise to engage its right operating end with the wheel immediately to the left of a tooth. Normally when slide 185 is reciprocated, pawl 249 will move idly above wheel 248 and pawl 250 will slide idly on the side of a tooth of wheel 248. Depression of key 17, however, will enable pawls 249, 250 as follows.

A leftwardly extending arm of pawl 249 has a horizontal slot 249*s*. The rear end of a slide 251 engages slot 249*s*. Slide 251 is constructed and is operated to enable pawl 249 substantially in accordance with the previously described slide 230 which is operated upon depression of key 15 to enable pawl 227. Accordingly, when key 17 rocks bail 244, a pin 244*p* (FIG. 12) at the end of a depending arm of the bail will engage an upper projection of slide 251 and move said slide rearwardly. As slide 251 is moved rearwardly, its rear end will be raised thereby rocking pawl 249 clockwise to lower its right end to a position immediately to the right of a tooth of wheel 248. Therefore, upon leftward movement of slide 185, pawl 249 will engage a tooth of wheel 248 and rotate shaft 247 a 60° turn counterclockwise and at the same time pawl 250 will be moved to the left and rocked counterclockwise to position its operating end immediately to the left of a tooth of wheel 248. As a result, when slide 185 is restored pawl 250 will engage a tooth of wheel 248 and step shaft 247 another 60° counterclockwise.

The previously described program slides 197, 198, 199, and 233, and program slides 253, 254 are controlled by cams 255, 256, 257, 258, 259, and 260 respectively engaging upstanding lugs on the cams.

During the 30° step of clutch 135, shaft 247 will be given a first step of rotation. In this operation, slides 197, 198, 199, 233 will be moved and held to the left by their respective cams.

The leftward movement of slide 197 will release carriage 2 and coupled stop carriage 119 for left shift as previously described, and the carriages will be shifted until arrested by engagement of stop arm 103 with stop drum 98. Furthermore, as previously described, arrest of the carriages will cause reengagement of clutch 135 to effect the divisor printing and entering operations.

The operation stemming from leftward movement of slide 198 has been described which operation provides for uncoupling of carriages 2, 119 for the carriage restoring operation.

In the divisor printing operation, means is operable to adjust shaft 68 and drive arms 67 to their rightmost position for operation of selection bar 59 for printing the decimal point in accordance with the setting of dial 7 and stop drum 98. This operation is controlled by leftward movement of slide 199 as previously described.

Clutch 135 is not disengaged when it completes its cycle in the divisor printing and entering operation, but continues 30° into the next cycle where it is arrested by clutch lever 182 (FIG. 8). This next cycle is for a total taking operation to print the quotient as later described. Movement of slide 233 toward the left controls this operation as previously described.

Near the end of the divisor printing and entering cycle, power slide 185 will be restored and program shaft 247 will be stepped another 60°. In this step of movement, the cams on shaft 247 will permit slides 197, 198, 199 to be restored by their springs; however slide 233 will be held in its left adjusted position.

In the 30° step of clutch 135 for the quotient printing cycle, program shaft 247 will again be stepped 60°. In this step of movement, slide 233 will still be held set and cam 259 will move and hold slide 253 to the left. The operations controlled by these settings will be described later with the quotient printing operation.

In the above described divisor printing and entering cycle of clutch 135, rear racks 23 (FIGS. 2*b*, 5*a*) will be controlled with respect to setting gears 28 to enter the divisor into the ordinally corresponding digital actuators 26 mounted in carriage 27 which, as previously noted, is normally in a right shifted position with the lowest order setting gear 28 in the plane of the lowest order rack 23. However, it is old in the art to control registering mechanism in a ten key machine to enter a value into a given register, storage or into settable actuators in accordance with a value in a selector carriage upon operation of the machine in response to depression of a given function key. The invention therefore is not concerned with the means for controlling this operation but only with the control of the ordinal relation of the selector carriage with respect to the racks.

It will be noted that the control of the ordinal position of carriage 2 by stop drum 98 in conjunction with stop arm 103 in the divisor entering operation is identical with the control exercised by the stop drum in the previously described multiplicand entering operation. It is therefore believed unnecessary to present examples to illustrate the operation.

*Division (quotient registration and printing)*

A program of division is initiated subsequent to entry of the divisor and the step of clutch 135 of the quotient printing cycle, and with carriage 27 shifted to left end position. Division is performed by the subtract, add, shift method; carriage 27 and counting gears 31, 32 coupled therewith being shifted one ordinal position to the right after registration of each quotient digit in register gears 30, 33. Quotient registration by this method is old and well known and concerns the invention only in the provision to effect quotient registration in such orders of register gears 30 that, in a total taking operation, the quotient will be printed in correct ordinal relation with the fixed decimal.

Clutch lever 182 (FIG. 8) will be rocked clockwise to reengage clutch 135 for the quotient printing operation. In this operation, comprising the major part of the clutch cycle, racks 23 will be controlled to zeroize wheels 30 of the storage register in which the quotient is registered. Furthermore, in the printing operation, shaft 68 and arms 67 will be in their intermediate position so that selection bar 60 will be operated to print the decimal point in accordance with the setting of dial 6.

Clutch lever 182 may be rocked to reengage clutch 135 automatically at the end of quotient registration or by obvious mechanical connections upon depression of a total key (not shown).

The means for adjusting shaft 68 and arms 67 to intermediate position includes slide 253 which was set to the left in the 30° step of the clutch cycle. A depending lug of slide 253 engages the right edge of a front arm of a bell crank 262. A right arm of the bell crank has connection with the front end of a rearwardly extending slide 263 which, adjacent its rear, carries an upstanding lug 263*a*. Lug 263*a* is positioned immediately to the rear of a depending part of bail 241 (FIGS. 10, 13). Accordingly this bail is rocked clockwise when slide 253 is moved leftward and shaft 68 and arm 67 will be moved to their intermediate position as previously described for operation of bail 241.

Near the end of the cycle, shaft 247 will again be stepped 60°. In this step of movement, the cam means of shaft 247 will permit slide 253 to be spring restored; however, slide 233 will yet be held in left adjusted position. Clutch 135, therefore, will not be disengaged at the end of the quotient printing cycle, but will continue in operation for another cycle. In this final cycle, the dividend remainder, if any, will be printed.

During the first part of this final cycle, shaft 247 will again be stepped 60°. During this step of movement, the cam means on shaft 247 will permit slide 233 to be spring retracted, and therefore clutch 135 will be disengaged at the end of the cycle and key 17 released. Furthermore, during this step, the cam means will move and hold slide 254 to the left.

Slide 254 has a lug engaging the front arm of a bell crank 264, a left arm of which is positioned immediately to the front of a depending arm of clutch lever 182 (FIG. 8). Therefore when slide 254 is moved to the left, bell crank 264 will be rocked clockwise (FIG. 13) and clutch lever 182 clockwise to disabled position. As a result, clutch 135 will complete the cycle without interruption. In this cycle of the clutch, racks 23 will be controlled to zeroize wheels 25 in which the dividend was registered for printing of the remainder. Shaft 68 and drive arms 67 will be in normal leftmost position and therefore the decimal point will be printed in alignment with the decimal point printed with the dividend.

Near the end of the cycle, shaft 247 will again be stepped 60°. In this step, the cam means on shaft 247 will permit slide 254 to be spring restored and the cams will be brought into position of the next dividend entering operation.

The following examples will illustrate the ordinal control of quotient registration in accordance with the principles of operation of the devices of the invention with decimal dial 7 (FIGS. 2, 5*c*) set to provide for two decimal digits in the divisors and dial 6 set to provide for one decimal digit in the quotients. It has therefore been determined that there will be three decimal digits in the dividends. Examples have been chosen without remainders which are printed in decimal alignment with the dividends.

In the first example the dividend will be .125 and the divisor will be .25 and these values will be printed as follows.

```
0.1 2 5  (dividend)
  0.2 5  (divisor)
```

The quotient 5 will be registered with carriage 27 in the lowest order position wherein counting gear 32 is engaged with the lowest order storage register gear 33 (FIG. 5*a*). Therefore the quotient will be registered ordinally in storage wheels 30, 33 and printed ordinally with respect to the dividend and divisor as follows.

```
0.1 2 5  (dividend)
  0.2 5  (divisor)
    0.5  (quotient)
```

In the second example, the dividend will be 1.25 and the divisor will be 2.5 and these values will be printed as follows.

```
1.2 5 0  (dividend)
  2.5 0  (divisor)
```

In this example, as in the first example, the quotient 5 will be registered with carriage 27 in the lowest order position and therefore the quotient will be registered and printed ordinally with respect to the dividend and divisor as follows.

```
2.2 5 0  (dividend)
  2.5 0  (divisor)
    0.5  (quotient)
```

In the third example, without decimal digits, the dividend will be 125 and the divisor 25 and these values will be printed as follows.

```
1 2 5.0 0 0  (dividend)
  2 5.0 0    (divisor)
```

In this example, the quotient 5 will be registered with counting gear 32 engaged with the second lowest order storage gear 33 and therefore the quotient will be registered and printed with respect to the dividend and divisor as follows.

```
1 2 5.0 0 0  (dividend)
  2 5.0 0    (divisor)
      5.0    (quotient)
```

*Overcapacity disabling means*

The decimal system has been disclosed as providing for a maximum of seven decimal digits in multiplicands, multipliers, and divisors.

Selector carriage 2 (FIGS. 1*a*, 5*c*, 7) has a twelve digit capacity and rotary digital actuators 26 (FIGS. 1*b*, 5*a*) in which a muliplicand or a divisor is entered from the selector carriage also have a twelve digit capacity. Therefore means is provided to lock multiplicand entry key 14 and divisor entry key 17 against depression to prevent entry of a multiplicand or of a divisor into actuators 26 if the number of whole number digits of the value entered into carriage 2 totaled with the number of decimal digits for which the machine is set exceeds twelve. But for this provision, an incorrect multiplicand or divisor could be entered in actuators 26.

Multiplier storage gears 30 (FIGS. 1*b*, 5*a*) in which a multiplier is entered from the selector carriage has a ten digit capacity. Therefore means is provided to lock multiplier entry key 15 against depression to prevent entry of a multiplier into gears 30 if the number of whole number digits of the value entered into carriage 2 totaled with the number of decimal digits for which the machine is set exceeds ten. But for this provision, an incorrect multiplier could be entered into storage gears 30.

Multiplicand entry key 14 and divisor entry key 17 are locked against depression by means for locking bail 153 (FIGS. 10, 12) from counterclockwise movement which movement, as previously described, is effected by depression of either of these keys. Multiplier entry key 15 is locked against depression by means for locking bail 163 from counterclockwise movement which movement, as previously described, is effected by depression of that key.

The means for locking bail 153 and thereby locking keys 14, 17 is operable in conjunction with means included in stop drum 98; whereas the means for locking bail 168 and thereby locking key 15 is operable in conjunction with means included in stop drum 97. The two locking means have substantially corresponding parts and operate in substantially the same manner. The locking means for key 15 is more clearly shown in the drawings, and therefore the following detailed description of this locking means is considered adequate.

Figure 1B:
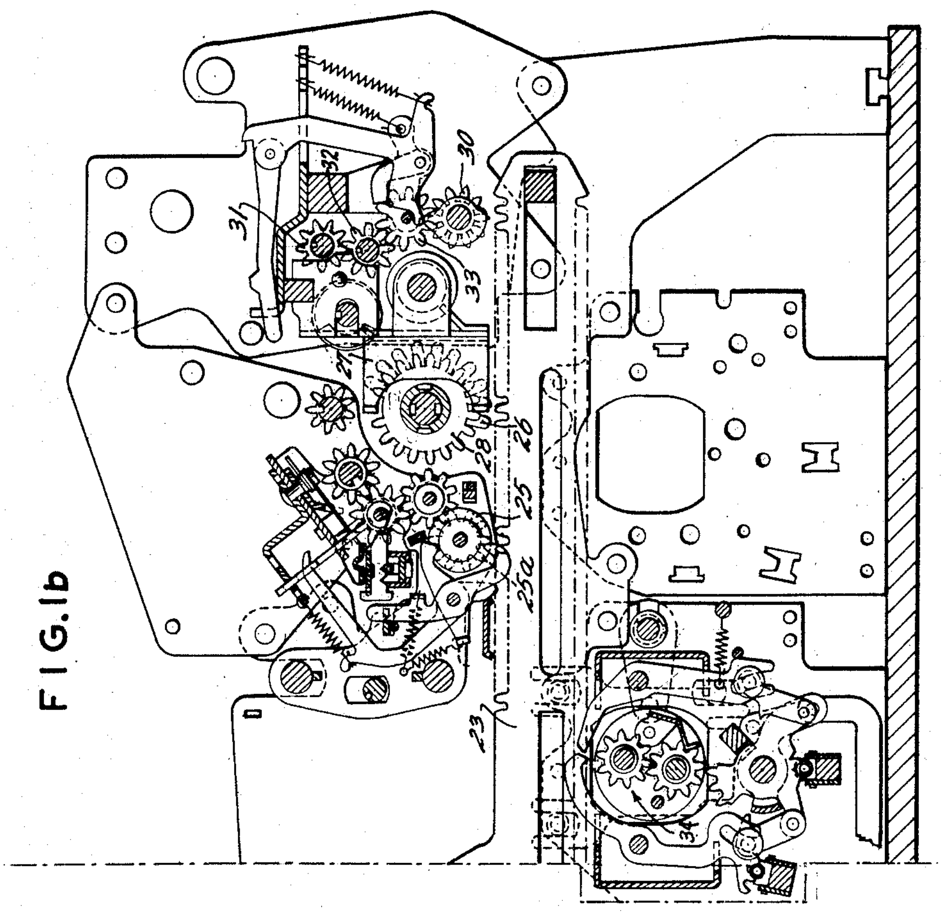

Stop drum 97 including steps 97*s* (FIGS. 5*b*, 7) has been described as settable for operation in conjunction with stop arm 103 to terminate left shift of selector carriage 2 in position for entry of a multiplier including from 0–7 decimal digits into the ten digit capacity storage gears 30 (FIGS. 1*b*, 5*a*).

Drum 97 has a spiral of seven steps 97*t*, similar to steps 97*s*, extending inwardly from the left end of the drum. Steps 97*t* extend inwardly from the left end of the drum in opposite direction from steps 97*s* extending inwardly from the right end, i.e., counterclockwise when viewed from the right (FIG. 7). Steps 97*t*, like steps 97*s*, each extend through an angle of 40° and extend longitudinally of the drum a distance equal to one ordinal shift of selector carriage 2. Steps 97*t* and the left periphery of the drum are operable in conjunction with the locking means for key 15 as follows.

A sensing arm 266 (FIGS. 5*b*, 7, 10) includes an upper cam end and has a hub portion splined for shifting movement on a transverse shaft 267 which is fulcrumed in the machine framing. Rack 89 (FIGS. 5*c*, 7), as described, is shifted to the right as carriage 2 is shifted to the left. An upstanding finger 89*f* at the right rear of rack 89 carries a pair of pins 89*p* which engage the hub of arm 266; and therefore the arm is shifted with the rack.

A rearwardly extending arm 268 is fast at its front on shaft 267 adjacent its left end. The lower end of a link 269 is pivotally connected to the rear of arm 268 and has its upper end pivotally connected to the rear of an arm 270 which at its front is loosely mounted on a transverse shaft 271 which extends above shaft 267 and is also fulcrumed in the machine framing.

A vertically disposed link 272 has common pivotal connection at its top with link 269 and arm 270, and is supported intermediate its ends by a fixed shaft 274 which engages a longitudinal slot in said link. A spring 275 normally holds link 272 raised to the limit imposed by shaft 274. Therefore arm 268, shaft 267 and sensing arm 266 will be held counterclockwise. Thus the upper cam end of arm 266 will normally be held in a path wherein, upon right shift movement, it will engage the periphery of drum 97.

A horizontally disposed lever 276 (FIGS. 5*b*, 5*c*, 10) has slot and pin connection at its rear with link 272 adjacent its lower end. Lever 276 is fulcrumed intermediate its ends on a pin 153*p* extending toward the left (FIG. 5*c*) from the end of depending arm 153 which, as previously described, is fast at its upper end on shaft 146. Arm 153 and shaft 146, as previously described, is rocked counterclockwise, upon depression of decimal key 3 or a function key 14–17, to couple selector carriage 2 and stop carriage 119.

Pin 153*p* fulcrums lever 276 by engagement with a longitudinal slot 276*s* in said lever. The front end of slot 276*s* curves downwardly and is rounded to the contour of pin 153*p* which normally engages this front end of the slot; such engagement being maintained by a spring which normally holds lever 276 clockwise about its slot and pin connection at the rear with link 272.

The front of lever 276 is in the form of an upwardly turned hook which is normally below and forwardly of a leftwardly turned lug at the end of a rearwardly extending arm of a crank 278 fulcrumed on a fixed shaft in the machine framing. Normally crank 278 is held clockwise by a torsion spring (not shown), and includes an upstanding arm having a rightwardly turned lug positioned to the rear and immediately above a rearwardly extending ear 168*a* (FIGS. 10, 12) of bail 168. Therefore, if crank 278 is rocked counterclockwise, the lug of its upper arm will be moved above ear 168*a* thereby locking bail 168 against counterclockwise movement and key 15 against depression.

Sensing arm 266 will be shifted one ordinal position to the right upon entry of each digit into selector carriage 2. If the number of whole number digits does not exceed the capacity, as previously explained, the cam end of sensing arm 266 will not engage drum 97 and said arm will remain counterclockwise. Then upon depression of decimal key 3 or key 15, the consequent counterclockwise movement of arm 153 will move lever 276 toward the rear thereby locating its hook end to the rear of the lug of the rear arm of crank 278. This rear movement of lever 276 is permitted by the slot and pin connection at its rear with link 272.

After the above operation upon depression of decimal key 3, the entry of decimal digits will further step shift sensing arm 266 toward the right. This may bring the cam end of the arm into engagement and past the left peripheral edge of drum 97, or into engagement and past bottom edge of a step 97*t*, depending on the setting of the drum. In this event, arm 266 will be rocked clockwise and through the connections, lever 276 will be rocked clockwise about its slot and pin fulcrum at the end of arm 153 to raise its hook end idly to the rear of the lug of the rear arm of crank 278; and therefore bail 168 and key 15 will not be locked.

When the number of whole number digits exceeds the capacity, drum 97 will cause lever 276 to be rocked clockwise as described above. This however will occur before lever 276 is moved rearwardly, as described, upon depression of decimal key 3. Therefore, clockwise movement of lever 276 will engage its front end with the lug of the rear arm of crank 278 thereby rocking the crank counterclockwise to lock bail 168 and key 15. In this operation the hook end of lever 276 will be located forwardly of the lug of the rear arm of crank 278 as shown in FIG. 10. Accordingly, when arm 153 is rocked counterclockwise upon depression of decimal key 3, the hook end will engage the lug of crank 278 thereby restraining lever 276 from rearward movement from engagement with the lug; and therefore key 15 will remain latched. In the counterclockwise movement of arm 153, pin 153*p* will be removed from the front depressed end of slot 276*s* and move therein toward the rear. The spring of lever 276 will yield to permit this operation, and lever 276 will be rocked slightly counterclockwise about its rear connection and crank 278 clockwise. This movement however is not sufficient to affect the locking operation.

The cam end of sensing arm 266 is three ordinal carriage shift positions (FIG. 5*b*) from the left end of drum 97 when carriage 2 is in right home position (FIG. 5*c*). When drum 97 is set for 0 decimal digits, the bottom of the seventh (last step) 97*t* is in the path of the cam end of arm 266. The cam end of arm 266 will be shifted to a position immediately to the left of the bottom of the seventh step 97*t* upon entry of ten whole number digits. Now if an eleventh whole number digit is entered, the cam end will engage and pass beyond the bottom of the step, and arm 266 will be rocked to effect the locking operation. As drum 97 is adjusted from 0 to its successive decimal digit positions, the bottoms of the sixth, fifth, etc., steps 97*t* will be brought into the path of arm 266. When the drum is adjusted for seven decimal digits, the peripheral left end of the drum will be in the path of arm 266, and will engage and operate the arm upon entry of the fourth digit.

Drum 97 is settable to control selector carriage 2 for entry of a maximum of seven decimal digits. Stop arm 103 for carriage 2 is normally in a central position (FIG. 7) with respect to stop drums 97, 98, and upon depression of key 15, it is rocked clockwise for shifting in a path to engage a step 97*s* of drum 97 to arrest left shift of the carriage. Because of the central position of arm 103, a number of decimal digits in excess to that provided for by the setting of drum 97 may be entered into carriage 2. This excess entry will shift arm 103 to the left past the step 97*s* which it should engage to limit left shift of the carriage. In this event, arm 103 cannot be rocked clockwise because it will engage the peripheral face of drum 97. Key 15 however can be depressed because of the yield afforded by springs 162, 171 (FIGS. 10, 12) in the train between key 15 and arm 103. Means therefore is provided to prevent engagement of main clutch 135 (FIG. 8) upon depression of key 15 if arm 103 is blocked from movement from its central position; otherwise a value would be printed in ordinally incorrect position with respect to the decimal point.

The means for preventing engagement of main clutch 135 includes a crank 280 (FIGS. 8, 10, 10A) pivotally mounted inwardly of the machine left side frame. Normally crank 280 is spring held clockwise (FIG. 8), counterclockwise (FIGS. 10, 10A) against a limit stop. When crank 280 is in normal position, a shoulder 280*s* is above the path of movement of a pin 180*p* of clutch lever 180 when said lever is rocked to engage clutch 135. Therefore normally, crank 280 will not interfere with engagement of the clutch.

A nose 280*n*, best seen in FIG. 10A, of crank 280 is located immediately to the rear of pin 164 which connects links 163, 173 and which engages slot 165*s* of crank 165. Crank 165, as described, is fast on shaft 118, and rocks said shaft and stop arm 103 splined thereon.

In normal operation upon depression of key 15, crank 165 will be rocked clockwise to likewise rock arm 103. In this operation, pin 164 in slot 165*s* will be raised idly above nose 280*n* without dislocating crank 280. However, if arm 103 is blocked from clockwise movement, both springs 162, 171 (FIGS. 10, 12) of the connections between key 15 and crank 165 will yield and pin 164 will be moved rearwardly in slot 165*s* to engage nose 280*n* thereby rocking crank 280 clockwise (FIGS. 10, 10A) to lower shoulder 280*s* into the path of pin 180*p* of clutch lever 180. The clutch lever therefore is blocked from movement to engage clutch 135. In this operation, the spring connection between links 178, 179 (FIG. 8) will yield as link 178 is moved rearwardly upon depression of key 15.

Upon depression of multiplicand entry key 14 or divisor entry key 17, arm 103 is rocked counterclockwise (FIG. 7) for association with stop drum 98. It will be apparent that when arm 103 is blocked from such movement by drum 98 when an excess of decimal digits is entered, the operation to prevent engagement of clutch 135 will be the same as described above for key 15.

I claim:

1. In a calculating machine having registering mechanism including an ordinal series of differential actuators, a selector carriage including an ordinal series of differentially settable digital value selection means for controlling said actuators, means for shifting said carriage relative to said actuators, digital value keys successively depressible in accordance with the digits of a selected value, means operable in response to each key depression for entering a digit into said selection means and for controlling said shifting means for one ordinal shift of said carriage in a given direction, and a first and a second function control key: a decimal key for depression in decimal sequence with said digit keys; a first and a second normally disabled shift limiting means each operable to limit shifting of said carriage in said given direction to a number of ordinal positions which provide for a given number of decimal digits; means operable upon depression of said decimal key for conditioning both of said limiting means for subsequent enablement; means operable upon depression of said first function control key subsequent to depression of said decimal key to enable said first shift limiting means and to initiate operation of said carriage shifting means for shifting in said given direction; and means operable upon depression of said second function control key subsequent to depression of said decimal key to enable said second shift limiting means and to initiate operation of said carriage shifting means for shifting in said given direction.

2. The invention according to claim 1: wherein said means operable upon depression of said first function control key is operable to enable said first shift limiting means if said decimal key has not been depressed; and said means operable upon depression of said second function control key is operable to enable said second shift limiting means if said decimal key has not been depressed.

3. The invention according to claim 1: provided with a third function control key; a third normally disabled shift limiting means for limiting shifting of said carriage in said given direction to the sum of the ordinal positions to which said carriage is limited by said first and second shift limiting means; means operable upon depression of said decimal key to enable said third shift limiting means; and means operable upon depression of said third function control key to initiate operation of said carriage shifting means for shifting in said given direction.

4. The invention according to claim 1: wherein said first and second shift limiting means are each differentially settable to limit shifting of said carriage in said given direction to a selected one of a plurality of numbers of ordinal positions.

5. The invention according to claim 4: provided with a third function control key; a third normally disabled shift limiting means differentially settable upon setting of said first and second shift limiting means to limit shifting of said carriage in said given direction to the sum of the positions to which said first and second shift limiting means are set; means operable upon depression of said decimal key to enable said third shift limiting means; and means operable upon depression of said third function control key to initiate operation of said carriage shifting means for shifting in said given direction.

6. In a calculating machine having registering mechanism including an ordinal series of differential actuators, digit type members differentially settable by said actuators respectively, a selector carriage including an ordinal series of differentially settable digital value selection means for controlling said actuators, means for shifting said carriage relative to said actuators, digital value keys successively depressible in accordance with the digits of a selected value, means operable in response to each key depression for entering a digit into said selection means and for controlling said shifting means for one ordinal shift of said carriage in a given direction, and a function control key: a decimal key for depression in decimal sequence with said digit keys; a normally disabled decimal point type member operable with respect to said digit type members to provide a given number of decimal digits, a normally disabled shift limiting means to limit shifting of said carriage in said given direction to a number of ordinal positions corresponding to the number of decimal digits provided for by said decimal point type member; means for enabling said shift limiting means upon depression of said decimal key; and means operable in response to depression of said function control key to initiate operation of said carriage shifting means for shifting in said given direction to enable said decimal point type member.

7. In a calculating machine having registering mechanism including an ordinal series of differential actuators, digit type members differentially settable by said actuators respectively, a selector carriage including an ordinal series of differentially settable digital value selection means for controlling said actuators, means for shifting said carriage relative to said actuators, digital value keys successively depressible in accordance with the digits of a selected value, means operable in response to each key depression for entering a digit into said selection means and for controlling said shifting means for one ordinal shift of said carriage in a given direction, and a function control key: a decimal key for depression in decimal sequence with said digit keys; a plurality of normally disabled decimal point type members each operable with respect to said digit type members to provide a given number of decimal digits; a decimal point selection means differentially settable for operation to enable a selected decimal point type member; a normally disabled shift limiting means differentially settable to limit shifting of said carriage in said given direction to a selected one of a plurality of numbers of ordinal positions; means for enabling said shift limiting means upon depression of said decimal key; and means operable in response to depression of said function control key to initiate operation of said carriage shifting means for shifting in said given direction and to operate said decimal point selection means.

8. In a calculating machine having registering mechanism including an ordinal series of differential actuators, digit type members differentially settable by said actuators respectively, a selector carriage including an ordinal series of differentially settable digital value selection means for controlling said actuators, means for shifting said carriage relative to said actuators, digital value keys successively depressible in accordance with the digits of a selected value, means operable in response to each key depression for entering a digit into said selection means and for controlling said shifting means for one ordinal shift of said carriage in a given direction, and a first and a second function control key: a decimal key for depression in decimal sequence with said digit keys; a first and a second normally disabled decimal point type member each operable with respect to said digit type members to provide a given number of decimal digits; a first and a second normally disabled shift limiting means operable to limit shifting of said carriage in said given direction to the number of ordinal positions which provide for the number of decimal digits corresponding to the number of decimal digits provided for by said decimal point type members respectively; means operable upon depression of said decimal key for conditioning both shift limiting means for subsequent enablement; means operable upon depression of said first function control key to enable said first shift limiting means, to initiate operation of said carriage shifting means for shifting in said given direction, and to enable said first decimal point type member; and means operable in response to depression of said second function control key to enable said second shift limiting means, to initiate operation of said carriage shifting means for shifting in said given direction and to enable said second decimal point type member.

9. The invention according to claim 8: provided with a third function control key; a third normally disabled decimal point type member operable with respect to said digit type members to provide a number of decimal digits equal to the sum of the decimal digits provided for by said first and second decimal point type members; a third normally disabled shift limiting means to limit shifting of said carriage to the number of ordinal positions which provide for the number of decimal digits corresponding to the number of decimal digits provided for by said third decimal point type member; means operable upon depression of said decimal key to enable said third shift limiting means; and means operable in response to depression of said third function control key to initiate operation of said carriage shifting means for shifting in said given direction and to enable said third decimal point type member.

10. In a calculating machine having reigstering mechanism including an ordinal series of differential actuators, digit type members differentially settable by said actuators respectively, a selector carriage including an ordinal series of differentially settable digital value selection means for controlling said actuators, means for shifting said carriage relative to said actuators, digital value keys successively depressible in accordance with the digits of a selected value, means operable in response to each key depression for entering a digit into said selection means and for controlling said shifting means for one ordinal shift of said carriage in a given direction, and a first and a second function control key: a decimal key for depression in decimal sequence with said digit keys; a plurality of normally disabled decimal point type members each operable with respect to said digit type members to provide a given number of decimal digits; a first and a second decimal point selection means each differentially settable for operation to enable a selected decimal point type member; a first and a second normally disabled shift limiting means each differentially settable to limit shifting of said carriage in said given direction to a number of ordinal positions which provide for a selected one of a plurality of numbers of decimal digits; means operable upon depression of said decimal key for conditioning both shift limiting means; means operable in response to depression of said first function control key to enable said first shift limiting means, to initiate operation of said carriage shifting means for shifting in said given direction, and to operate said first decimal point selection means; and means operable in response to depression of said second function control key to enable said second shift limiting means, to initiate operation of said carriage shifting means for shifting in said given direction, and to operate said second decimal point selection means.

11. The invention according to claim 10: provided with a third function control key; a third decimal point selection means differentially settable for operation to enable a selected decimal point type member; a normally disabled third shift limiting means differentially settable to limit shifting of said carriage in said given direction to a selected one of a plurality of numbers of ordinal positions; means operable to enable said third shift limiting means upon depression of said decimal key; and means operable in response to depression of said third function control key to initiate operation of said carriage shifting means for shifting in said given direction, and to operate said third decimal point selection means.

12. The invention according to claim 10: provided with drive means for setting said first decimal point selection means to provide for a given number of decimal digits, and for simultaneously setting said first shift limiting means to limit shifting of said carriage in said given direction to the ordinal position which provides for said given number of decimal digits; and drive means for setting said second decimal point selection means to provide for a given number of decimal digits, and for simultaneously setting said second shift limiting means to limit shifting of said carriage in said given direction to the ordinal position which provides for said given number of decimal digits.

13. The invention according to claim 12: provided with a third function control key; a third decimal point selection means differentially settable for operation to enable a selected decimal point type member; a normally disabled third shift limiting means differentially settable to limit shifting of said carriage to a selected one of a plurality of numbers of ordinal positions; means for enabling said third shift limiting means upon depression of said decimal key; drive means including differential means operable upon setting of said first and second shift limiting means to set simultaneously said third shift limiting means and third decimal selection means in accordance with the sum of the settings of said first and second shift limiting means; and means operable in response to depression of said third function control key to initiate operation of said carriage shifting means for shifting in said given direction and to operate said third decimal point selection means.

14. In a calculating machine having registering mechanism including an ordinal series of differential actuators, a selector carriage including an ordinal series of differentially settable digital value selection means for controlling said actuators, means for shifting said carriage relative to said actuators, digital value keys successively depressible in accordance with the digits of a selected value, means operable in response to each key depression for entering a digit into said selection means and for controlling said shifting means for one ordinal shift of said carriage, and a first and a second function control key: a decimal key for depression in decimal sequence with said digit keys; a shift control member shiftable from a home position normally in an inoperative path of movement and adjustable for shifting in either a first or a second operative path of movement; means operable upon depression of said decimal key for coupling said shift control member with said carriage for shifting therewith; a first stop member having a plurality of stop surfaces respectively for engagement by said shift control member when shifted with said carriage given numbers of ordinal positions and differentially settable to locate any selected one of said surfaces into said first operative path of movement; a second stop member having a plurality of stop surfaces respectively for engagement by said shift control member when shifted with said carriage given numbers of ordinal positions, and differentially settable to locate any selected one of said surfaces into said second operative path of movement; means operable upon depression of said first function control key to adjust said shift control member into said first operative path of movement and to initiate operation of said carriage shifting means; and means operable upon depression of said second function control key to adjust said shift control member into said second operative path of movement and to initiate operation of said carriage shifting means.

15. The invention according to claim 14: wherein said means for coupling said shift control member with said carriage is operable upon depression of either of said function control keys if said decimal key has not been depressed.

16. The invention according to claim 14: provided with a third function control key; a second shift control member shiftable from a home position in an operative path of movement; means operable upon depression of said decimal key for coupling said second shift control member with said carriage for shifting therewith; a third stop member having a plurality of stop surfaces respectively for engagement by said second shift control member when shifted with said carriage given numbers of ordinal positions, and differentially settable to locate any selected one of said surfaces in said operative path of movement of said second shift control member; means for setting said third stop member in accordance with the sum of the settings of said first and second stop members; and means operable in response to depression of said third function control key to initiate operation of said carriage shifting means.

17. In a calculating machine having registering mechanism including an ordinal series of differential actuators, a selector carriage including an ordinal series of differentially settable digital value selection means for controlling said actuators, means for shifting said carriage relative to said actuators, digital value keys successively depressible in accordance with the digits of a selected value, means operable in response to each key depression for entering a digit into said selection means and for controlling said shifting means for one ordinal shift of said carriage in a given direction, and a function control key: a normally disabled shift limiting means operable to limit shifting of said carriage in said given direction to a number of ordinal positions which provide for a given number of decimal digits; means operable upon depression of said decimal key for conditioning said limiting means for subsequent enablement; and means operable upon a depression of said function control key subsequent to the depression of said decimal key to enable said shift limiting means and to initiate operation of said carriage shifting means for shifting in said given direction.

18. In a calculating machine having registering mechanism including an ordinal series of differential actuators, a selector carriage including an ordinal series of differentially settable digital value selection means for controlling said actuators, means for shifting said carriage relative to said actuators, digital value keys successively depressible in accordance with the digits of a selected value, means operable in response to each key depression for entering a digit into said selection means and for controlling said shifting means for one ordinal shift of said carriage in a given direction, and a first and a second function control key: a first and a second shift limiting means each operable to limit shifting of said carriage in said given direction to a number of ordinal positions which provide for a given number of decimal digits; means operable in response to depression of said first function control key to initiate operation of said carriage shifting means for shifting in said given direction under control of said first shift limiting means, and means operable in response to depression of said second function control key to initiate operation of said carriage shifting means for shifting in said given direction under control of said second shift limiting means.

19. In a calculating machine having printing mechanism including an ordinal series of differentially settable digit type members; an ordinal series of differential actuators for setting said digit type members respectively; differentially settable digital value selection means for controlling said actuators; means for entering selected values into said selection means; and drive means for operating said printing mechanism in one or in another type of machine operation: a plurality of decimal point type members each operable with respect to said digit type members to provide a different number of decimal digits; a first decimal point selection means operable prior to entry of a value in said digital value selection means to select a first given one of said decimal point type members; a second decimal point selection means operable prior to entry of a value in said digital value selection means to select a second given one of said decimal point type members; a first control means operable in said one type of machine operation to cause operation of said first decimal point type member; and a second control means operable in said other type of machine operation to cause operation of said second decimal point type member.

References Cited by the Examiner

UNITED STATES PATENTS

| | | | |
|---|---|---|---|
| 1,503,742 | 8/24 | Bacon | 235—61 |
| 2,467,419 | 4/49 | Avery. | |
| 2,935,250 | 5/60 | Reppert | 235—60.15 |
| 2,987,246 | 6/61 | Wagemann | 235—60.1 |
| 3,057,549 | 10/62 | Wagemann | 235—61 |
| 3,081,938 | 3/63 | Walther | 235—60.1 |

FOREIGN PATENTS

| | | |
|---|---|---|
| 516,060 | 6/53 | Belgium. |
| 789,416 | 1/58 | Great Britain. |
| 564,394 | 6/57 | Italy. |
| 565,041 | 7/57 | Italy. |

LEYLAND M. MARTIN, *Primary Examiner.*

LEO SMILOW, *Examiner.*